United States Patent [19]

Ross et al.

[11] Patent Number: 4,761,563

[45] Date of Patent: Aug. 2, 1988

[54] ASYNCHRONOUS MULTIPHASE SWITCHING GEAR

[75] Inventors: John M. Ross, Annandale; George K. Woodworth, Manassas, both of Va.

[73] Assignee: International Business Machines Corporation, Armonk, N.Y.

[21] Appl. No.: 113,926

[22] Filed: Oct. 27, 1987

[51] Int. Cl.⁴ ............................................... H02J 3/00
[52] U.S. Cl. ........................................ 307/87; 307/66; 307/64; 307/82
[58] Field of Search ..................................... 307/52–87

[56] References Cited

U.S. PATENT DOCUMENTS

| | | |
|---|---|---|
| 2,968,705 | 12/1958 | Monbeck et al. |
| 3,061,736 | 10/1960 | Devine. |
| 3,515,894 | 6/1970 | Swing et al. ........................... 307/64 |
| 3,601,659 | 8/1971 | Tanaka. |
| 3,638,040 | 1/1972 | Mahmoud. |
| 3,906,335 | 9/1975 | Watanabe et al. ................. 307/82 X |
| 3,908,132 | 9/1975 | Krampe et al. ...................... 307/87 |
| 3,999,078 | 12/1976 | Udvardi-Lakos ..................... 307/66 |
| 4,090,090 | 5/1978 | Johnston. |
| 4,096,395 | 6/1978 | Bogel et al. |
| 4,262,214 | 4/1981 | Patel. |
| 4,356,402 | 10/1982 | Morimoto et al. |
| 4,384,213 | 5/1983 | Bogel. |
| 4,405,867 | 9/1983 | Moakler et al. |
| 4,419,591 | 12/1983 | Irokawa et al. ................... 307/82 X |
| 4,441,032 | 4/1984 | Sakurai et al. ........................ 307/82 |
| 4,543,492 | 9/1985 | Inokuchi et al. ..................... 307/82 |
| 4,652,770 | 3/1987 | Kumano ............................ 307/87 X |
| 4,667,116 | 5/1987 | Honjo et al. ...................... 307/66 X |
| 4,677,309 | 6/1987 | Ogawa .............................. 307/87 X |

FOREIGN PATENT DOCUMENTS 543156  2/1977  U.S.S.R.

OTHER PUBLICATIONS

T. Wolpert, "Uninterruptible Power Supply for Critical AC Loads-A New Approach", *IEEE Transactions on Industry Applications*, vol. 1A-10, No. 5, pp. 627–634, Sep./Oct. 1974.

Primary Examiner—William M. Shoop, Jr.
Assistant Examiner—Paul Ip
Attorney, Agent, or Firm—John E. Hoel

[57] ABSTRACT

An asynchronous multiphase switching method and apparatus are disclosed which transfers a system load between two asynchronous AC power sources in an improved manner. It operates as a make-before-break switch to provide uninterrupted power to the system load during the transfer while minimizing voltage and current fluctuations. The control circuitry allows energy to be supplied to the load during the transition without allowing current to flow between the power sources. A matrix of SCRs is used to transfer the load between the two power sources. The switches to be gated are determined by the relative timing relationships of the existing and takeover voltage waveforms. By altering the pattern of the switches which are gated and by controlling the direction of energy flow, the transition can be made between the power sources without interruption of power.

3 Claims, 16 Drawing Sheets

AMSG FUNCTIONAL BLOCK DIAGRAM

AMSG FUNCTIONAL BLOCK DIAGRAM

A 3 PHASE VOLTAGE SOURCE

PHASE TO PHASE VOLTAGE, $V_{AB} = |V_A| + |V_B|$

THE PHASES OF SOURCE 1 AND THE PHASES OF SOURCE 2 ARE NOT ALIGNED IN TIME, THEREFORE THE SOURCES ARE NOT SYNCHRONIZED

VOLTAGE AND CURRENT IN PHASE: Q=1

CURRENT LEADS VOLTAGE: LEADING POWER FACTOR, Q = COS(∅)

CURRENT LAGS VOLTAGE: LAGGING POWER FACTOR, Q = COS(∅)

SCR BANK NETWORK

PARALLEL AND OPPOSED SCR'S ALLOWING BIDIRECTIONAL CURRENT CONTROL

THE THREE VALID SCRB CONNECTION CONFIGURATIONS

ILLUSTRATION OF PHASE DIFFERENCE VARIATION OVERTIME FOR A SINGLE PHASE BETWEEN TWO 3 PHASE SOURCES WITH DIFFERENT FREQUENCIES $V_A$: 57 Hz
$V_{A'}$: 63 Hz

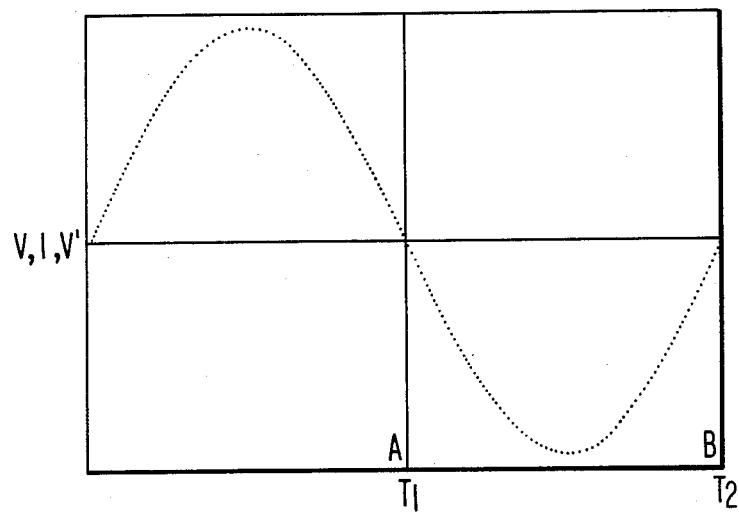
FIG. 17. CASE 1
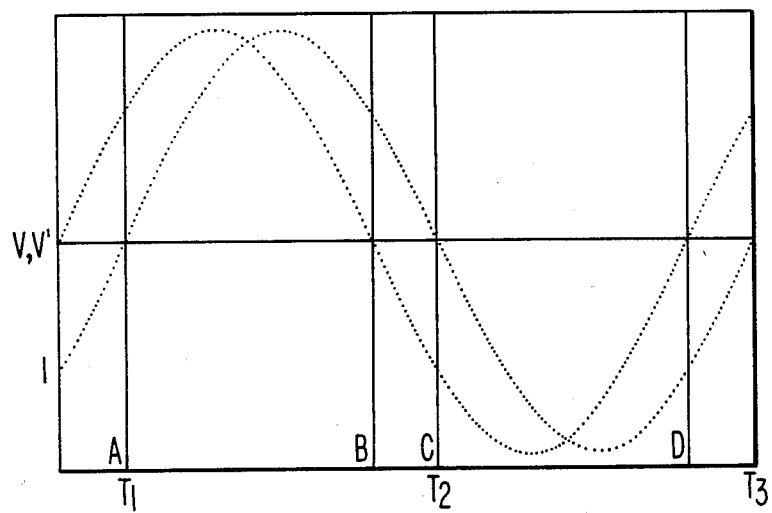
FIG. 18. CASE 2
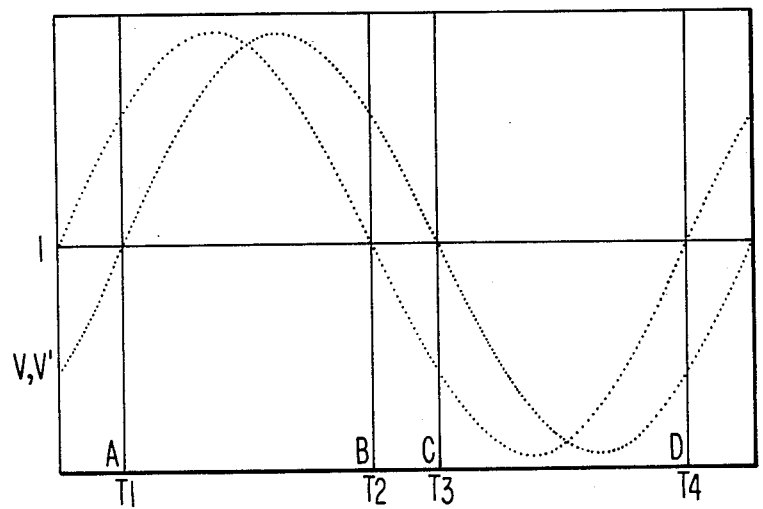
FIG. 19. CASE 3

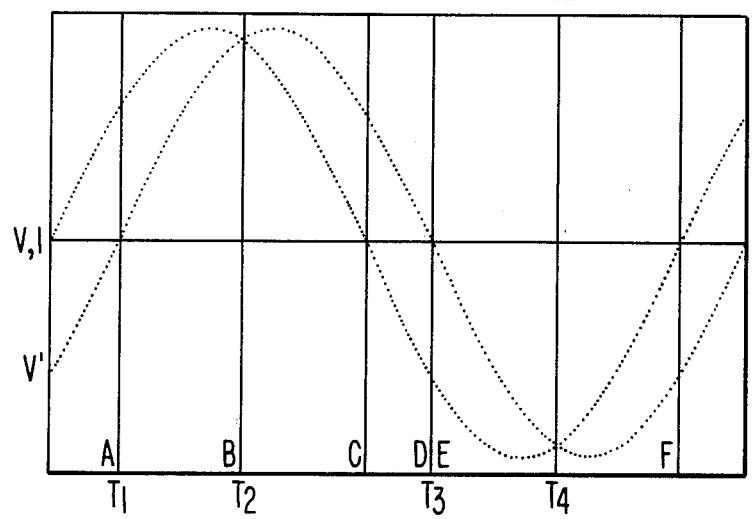
FIG. 20. CASE 4
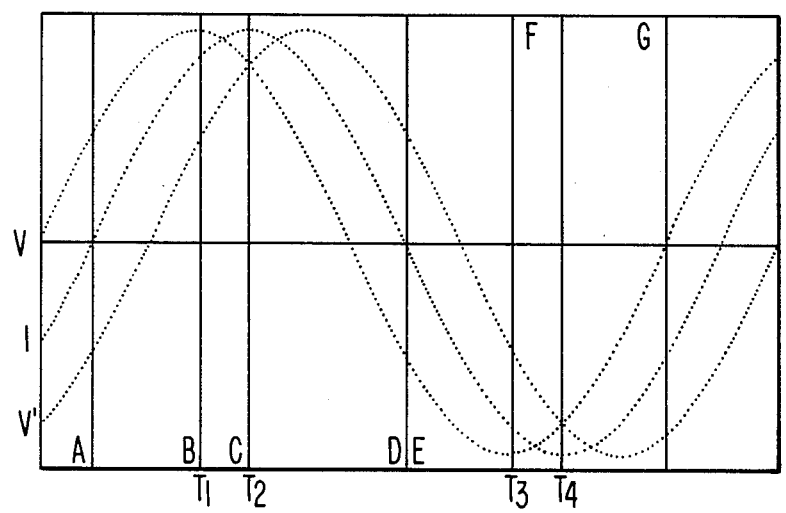
FIG. 21. CASE 5A
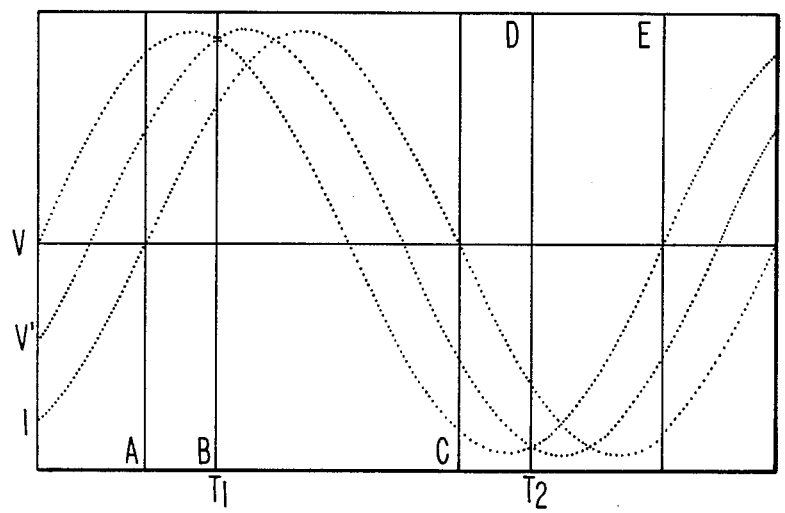
FIG. 22. CASE 5B

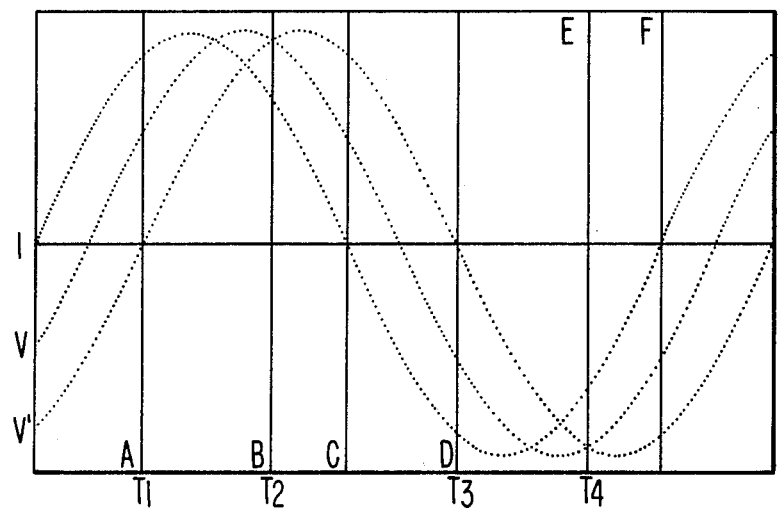
FIG. 23. CASE 6
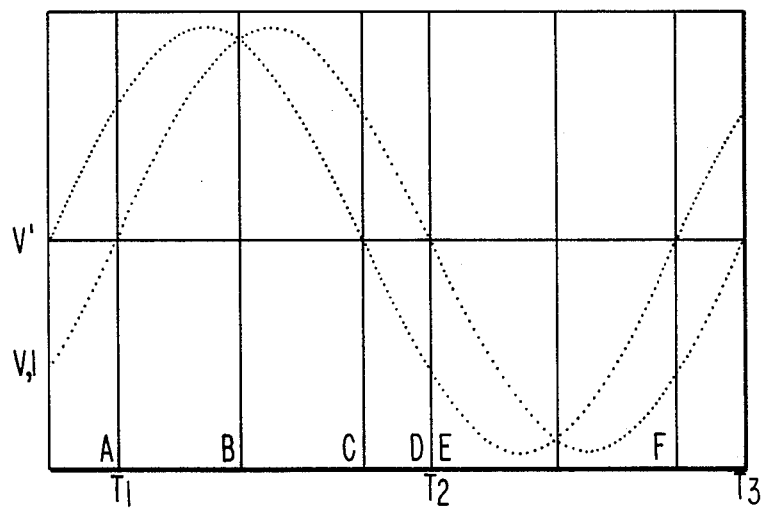
FIG. 24. CASE 7
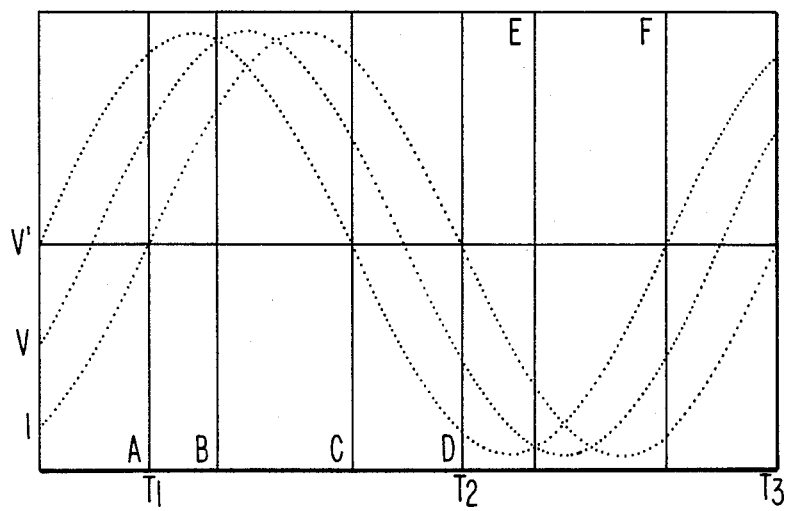
FIG. 25. CASE 8

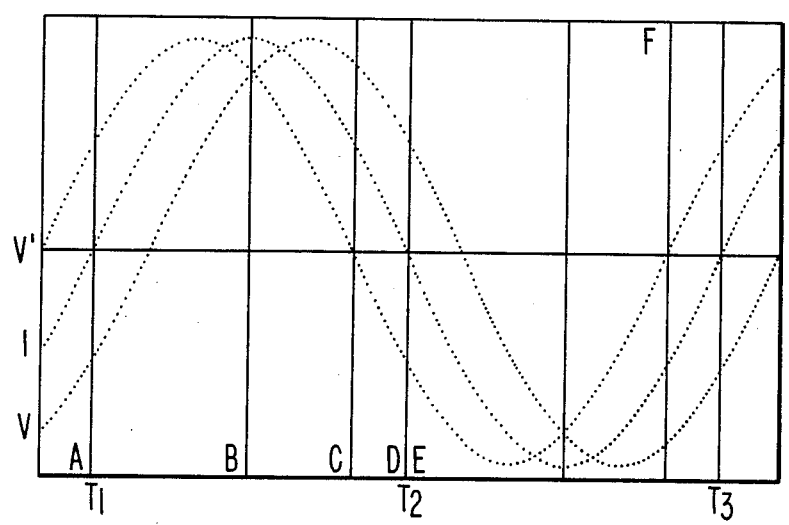
FIG. 26. CASE 9A
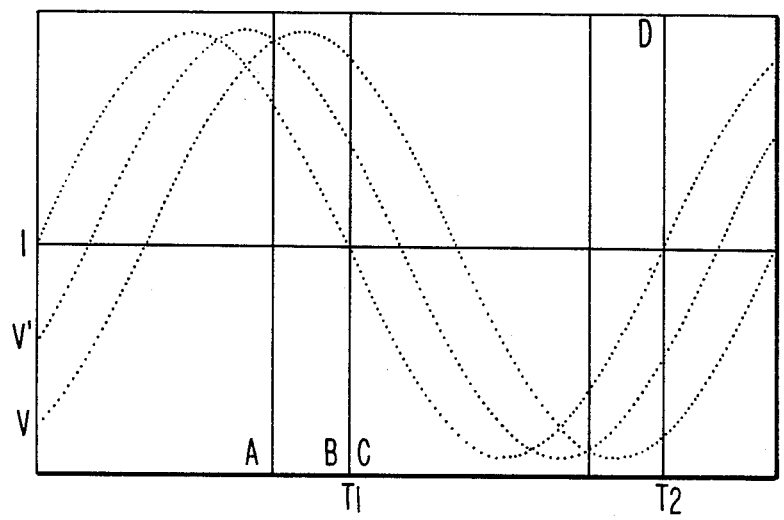
FIG. 27. CASE 9B
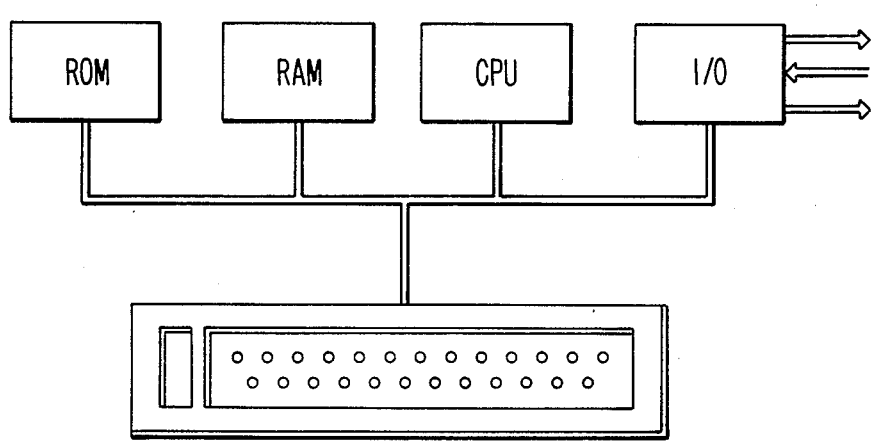
FIG. 29.
CONTROL UNIT

WAVEFORM COINCIDENCE DETECTOR CIRCUIT

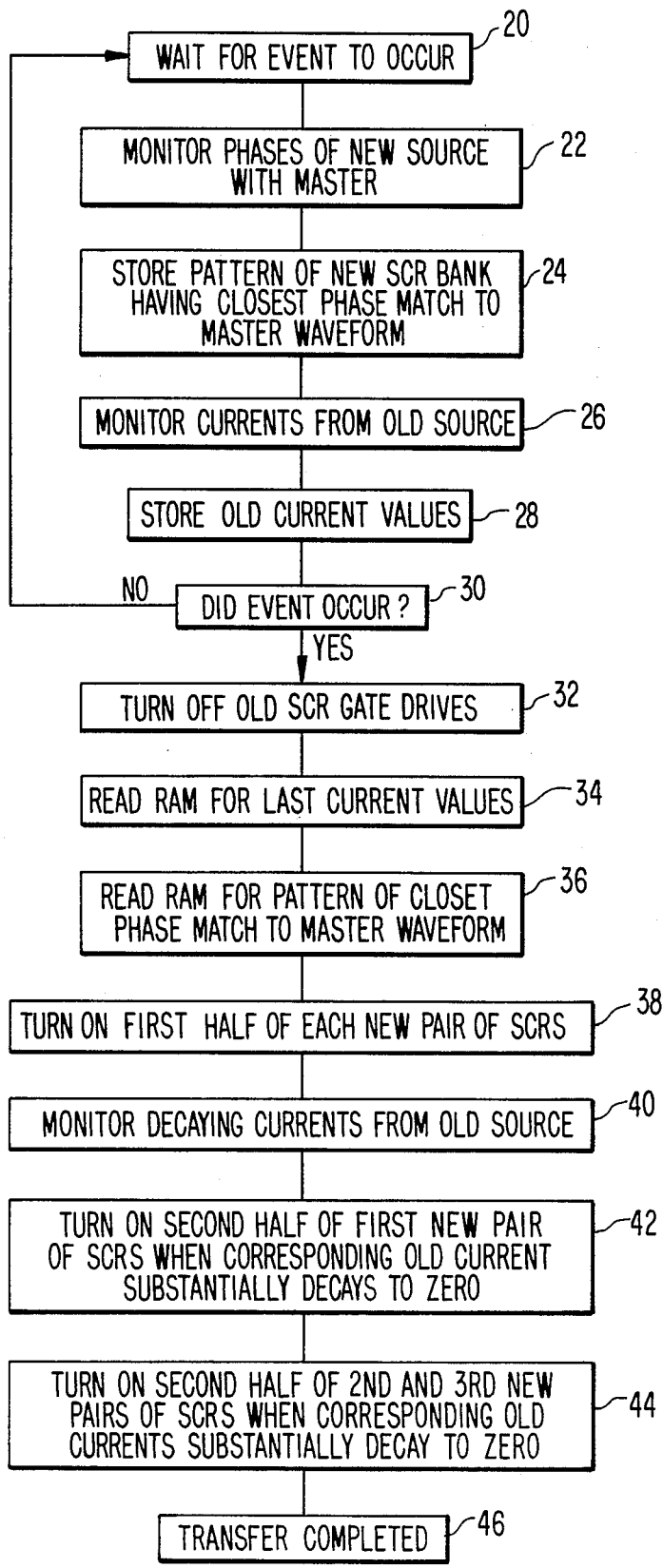

ASYNCHRONOUS MULTIPHASE SWITCHING GEAR

BACKGROUND OF THE INVENTION

1. Technical Field

The invention disclosed broadly relates to the switching of multiphase electrical power sources and more particularly relates to asynchronous multiphase switching techniques.

2. Background Art

Military power systems require frequent switching of the system load between several AC power sources. Aircraft switch from ground power to on board power prior to takeoff. The computerized electronic systems are often required to operate without power interruptions through this switching activity. Submarines, due to operational drills or casualty situations, need to alternate between their port and starboard power sources. This activity must not disrupt critical navigational, weapons, and sonar systems.

AC power sources cannot be paralleled unless the characteristics of the alternators are similar and operated at the same speed and voltage ratings. To allow paralleling, the power sources also have to be aligned electrically so that their respective phases can be tied together. If the speed or angle of rotation between each alternator is not exact, the machines will try to force each other into synchronism. This is an abrupt action as the rotating masses of the alternators cannot change speed instantaneously. The machines will nevertheless try to get into alignment as quickly as possible. The chances for the alternators to damage each other or physically break free from their moorings is very great especially when large unsynchronized machines are paralleled.

If the output voltages of the alternators are not equal, the one with the higher voltage will "hog" the load, making the sharing of demand difficult and causing poor utilization of the equipment. These difficulties cause the process of paralleling alternators to be a sensitive operation, especially with machines larger than several kilowatts. For this reason, system load transfers between power sources have required that the old power source be disconnected before the new power source is connected. This break-before-make switch causes power dropouts for significant time intervals, seriously impacting the system load.

Previously, reliance on fast recovery computer systems has tried to reduce exposure to this weakness on the platform. With low conversion efficiencies, conversion of the AC power to a common DC grid, and then inversion back to AC becomes prohibitive as the power handled increases. The batteries and switching equipment necessary to implement such a conversion/inversion occupy too much space and increase the overall weight greatly. Cooling the conversion equipment becomes an additional concern as the efficiency losses are given up as waste heat.

DC "auctioneering" or switching between two power sources is somewhat easier. However, redesigning equipment to operate off of DC power sources often requires great expense and renders older equipment obsolete. Control and switching of DC power also increases the complexity and size of hardware design and this impact limits the conversion of older equipment to DC.

What is needed is uninterrupted power switching provided by a new method not requiring synchronous power sources.

OBJECTS OF THE INVENTION

It is therefore an object of the invention to transfer, without interruption, a load between sources that are not synchronous, so as to allow for differing frequencies, differing voltages and differing phases between the sources.

It is another object of the invention to detect and inhibit a reverse phase operation of a switch.

It is yet a further object of the invention to monitor current and voltage so as to allow switching loads with large reactive components.

It is still a further object of the invention to monitor line voltage of both sources and to switch those sources, if needed, or alternately, to inhibit a switching event if a new source is out of tolerance.

It is yet a further object of the invention to actively switch one line at a time so as to assure power continuity without tying the power buses together or allowing reversed current to occur.

It is yet a further object of the invention to actively switch line-by-line the load to a new power source so as to allow alignment between the power sources, thereby achieving automatic line swapping, permitting the alignment of two, three phase power sources.

It is still a further object of the invention to provide automatic one-way transfers to limit or control self power seeking operations.

It is still a further object of the invention to minimize electrical stress on the load or power sources by providing a make-before-break switching function without having a back electromagnetic force reaction which may damage or stress the sources or loads.

It is yet a further object of the invention to provide for a fault detection and blocking function so as to isolate faulted loads and avoid switching such faulted loads to other power sources.

It is still a further object of the invention to allow the switching of sensitive loads at a speed sufficient to eliminate a power dropout, so as to prevent the need for expensive backup power systems.

SUMMARY OF THE INVENTION

These and other objects, features and advantages of the invention are accomplished by the asynchronous multiphase switching method and apparatus disclosed herein. The asynchronous multiphase switch gear (AMSG) implements a new method for transferring a system load between two asynchronous AC power sources. The power sources are assumed to be similar in voltage, frequency, phase rotation, and phase configuration (wye/delta). The AMSG is a make-before-break switch that provides uninterrupted power to the system load during the transfer while minimizing voltage and current jitter. Make-before-break switching could previously be used when paralleling AC sources to a load only if both power sources were first driven into synchronization.

Electronic switching of power sources in a make-before-break manner requires bridging the load between the old and new sources simultaneously. This "energy bridge" must be carefully designed to direct power to the load without allowing the sources to influence each other. The control circuitry must be designed to allow energy to be supplied to the load, without allowing current to flow between the sources.

The AMSG was designed using silicon controlled rectifiers (SCRs) as switching elements. SCRs provide high peak power handling capability, and exhibit low conduction losses. The SCRs act as unidirectional valves between the power sources and the load. By controlling the SCRs at precise moments in time, it becomes possible to share the load between the two sources without tying them together.

During the period of switching between the two power sources, the SCRs are used as diode switches, conducting in a unidirectional manner. Thus, back-to-back SCRs effectively "dot or" the two AC sources to the load. The highest voltage source feeds the load until the phases commutate, at which point the current required from the old source is reduced to zero and its SCRs turn off (become nonconductive). This process occurs on a phase-by-phase basis until the total load power is taken from the new source.

Prior to connecting the load to a power source, the voltage amplitude and phase rotation of each source are checked to be within specified limits. Only then will gate control signals be provided to the appropriate SCRs to allow energy conduction to the load. The initial application of power to the load is a straightforward phase-to-phase switching operation. The selected power source is simply connected to the load terminals.

A matrix of SCRs is used to transfer the load between the two power sources. The switches to be gated are determined by the relative timing relationships of the old and new voltage waveforms. Altering the pattern of the switches gated and controlling the direction of energy flow, allows jumping, without power interruption, between separate sources.

The AMSG chooses one phase voltage at the load to be compared with the new sources' phase voltages. The angular displacement between the load phase and the closest new source phase will be a maximum of 60 degrees relative to the load phase, +/− any error due to a slight differences in frequency. Therefore, when transferred between power sources the load will never see a voltage or current jitter greater than approximately a 60 degree shift.

The AMSG is controlled by a microprocessor which selects the SCR diodes to be gated during a load transfer and also determines the best match between the load phase and the new source phases. Operation of this smart switch allows selection of the proper SCRs prior to the transfer. By looking ahead, no time is required to compute an SCR matrix solution. This is necessary, for in the event of a failure of the old power source, there would be no waveform available to compare the old source with.

BRIEF DESCRIPTION OF THE DRAWINGS

These and other objects, features and advantages of the invention will be more fully appreciated with reference to the accompanying figures.

FIG. 13 shows for which two phases the voltage is measured between.
FIG. 16 shows that only the old SCRs that were conducting will remain on.
FIG. 17 illustrates the example of Case 1.
FIG. 18 illustrates the example of Case 2.
FIG. 19 illustrates the example of Case 3.
FIG. 20 illustrates the example of Case 4.
FIG. 21 illustrates the example of Case 5A.
FIG. 22 illustrates the example of Case 5B.
FIG. 23 illustrates the example of Case 6.
FIG. 24 illustrates the example of Case 7.
FIG. 25 illustrates the example of Case 8.
FIG. 26 illustrates the example of Case 9A.
FIG. 27 illustrates the example of Case 9B.
FIG. 29 is a schematic diagram of the control unit.
FIG. 31 is a flow diagram of the transfer on the detection of an event.

DESCRIPTION OF THE BEST MODE FOR CARRYING OUT THE INVENTION

Figure 1:
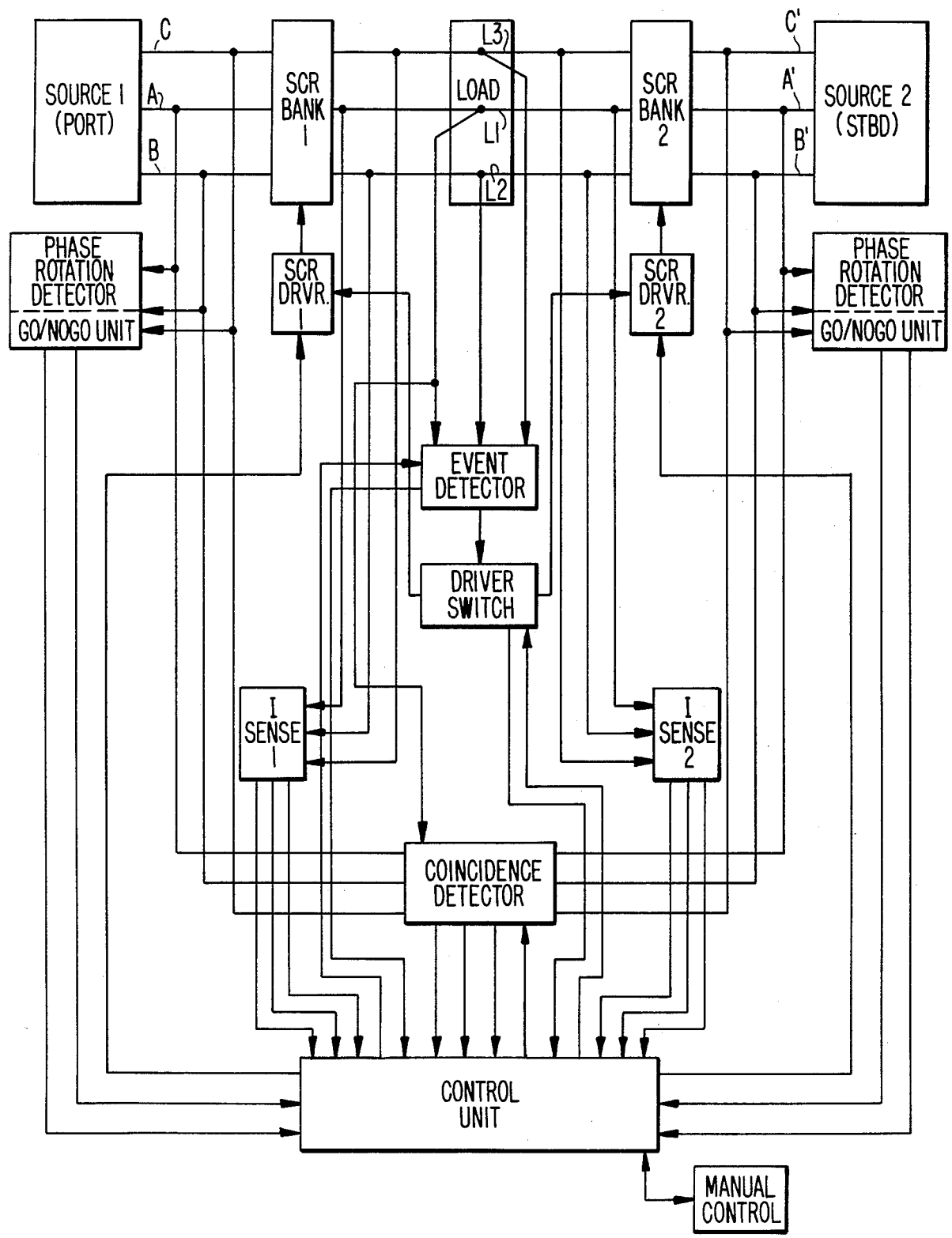
FIG. 1 is a functional block diagram of the invention.

The asynchronous multiphase switch gear (AMSG) implements a new method for transferring a system load between two asynchronous AC power sources. The power sources are assumed to be similar in voltage, frequency, phase rotation, and phase configuration (wye/delta). The AMSG is a make-before-break switch that provides uninterrupted power to the system load during the transfer while minimizing voltage and current jitter. Make-before-break switching could previously be used when paralleling AC sources to a load only if both power sources were first driven into synchronization.

Electronic switching of power sources in a make-before-break manner requires bridging the load between the old and new sources simultaneously. This "energy bridge" must be carefully designed to direct power to the load without allowing the sources to influence each other. The control circuitry must be designed to allow energy to be supplied to the load, without allowing current to flow between the sources.

The AMSG was designed using silicon controlled rectifiers (SCRs) as switching elements. SCRs provide high peak handling capability, and exhibit low conduction losses. The SCRs act as unidirectional valves between the power sources and the load. By controlling the SCRs at precise moments in time, it becomes possible to share the load between the two sources without tying them together.

During the period of switching between the two power sources, the SCRs are used as diode switches, conducting in a unidirectional manner. Thus, back-to-back SCRs effectively "dot or" the two AC sources to the load. The highest voltage source feeds the load until the phases commutate, at which point the current required from the old source is reduced to zero and its SCRs turn off (become nonconductive). This process occurs on a phase-by-phase basis until the total load power is taken from the new source.

Prior to connecting the load to a power source, the voltage amplitude and phase rotation of each source are checked to be within specified limits. Only then will gate control signals be provided to the appropriate SCRs to allow energy conduction to the load. The initial application of power to the load is a straightforward phase-to-phase switching operation. The selected power source is simply connected to the load terminals.

A matrix of SCRs is used to transfer the load between the two power sources. The switches to be gated are determined by the relative timing relationships of the old and new voltage waveforms. Altering the pattern of the switches gated and controlling the direction of energy flow, allows jumping, without power interruption, between separate sources.

The AMSG chooses one phase voltage at the load to be compared with the new sources' phase voltages. The angular displacement between the load phase and the closest new source phase will be a maximum of 60 degrees relative to the load phase, +/- any error due to slight differences in frequency. Therefore, when transferred between power sources the load will never see a voltage or current jitter greater than approximately a 60 degree shift.

The AMSG is controlled by a microprocessor which selects the SCR diodes to be gated during a load transfer and also determines the best match between the load phase and the new source phases. Operation of this smart switch allows selection of the proper SCRs prior to the transfer. By looking ahead, no time is required to compute an SCR matrix solution. This is necessary, for in the event of a failure of the old power source, there would be no waveform available to compare the old source with.

The asynchronous multiphase switch gear invention is shown in the functional block description of FIG. 1.

1. SOURCES 1,2—Each power source in this specific design is a 480 V (+/-10%), 60 Hz (+/-5%), three phase delta. A three phase power source is comprised of three identical sine waves, with a phase shift of 120 degrees between each waveform. the three sine waves correspond to three voltages (see FIG. 2).

A delta power source has three nodes or "legs," with one voltage between each pair of legs. In a delta power source, there is no ground reference; the voltage between each pair of legs (the phase-to-phase voltage) is the sum of the absolute values of the two voltages (see FIG. 3).

Figure 2:
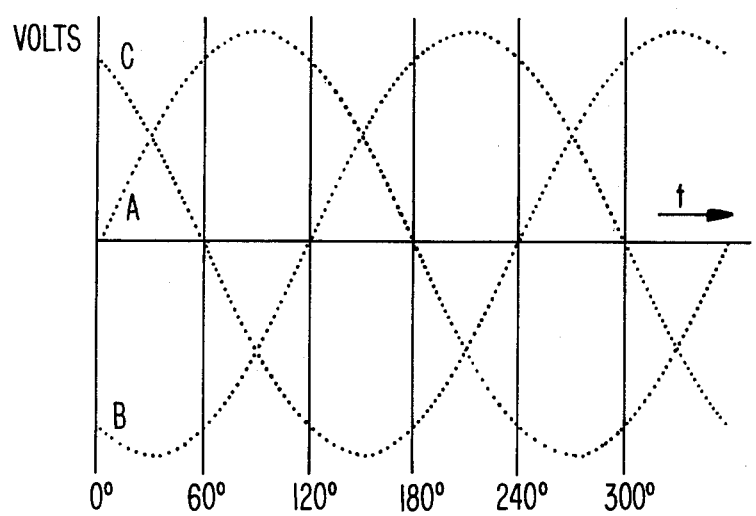
FIG. 2 illustrates a three phase voltage source.
Figure 3:
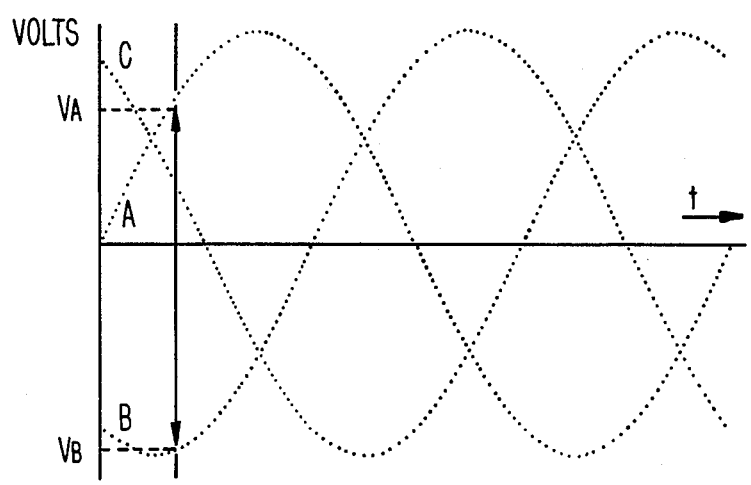
FIG. 3 illustrates the phase-to-phase voltage $V_{AB}$.

In FIGS. 2 and 3 the sine waves are labeled as phases A, B, and C. As time advances from 0 to T1 the phases occur in the order A-B-C. Beyond T1, this order continues to repeat: A-B-C. This sequence is defined as the phase rotation of the power source. In FIG. 2, the phase rotation is A-B-C-A-B-C-A, etc. When providing power to a device such as a motor or a pump, whose operation depends upon mechanical rotation, it is crucial that the order of phase rotation be maintained. This will be an important point later in the discussion of transferring a load between two independent sources.

Figure 4:
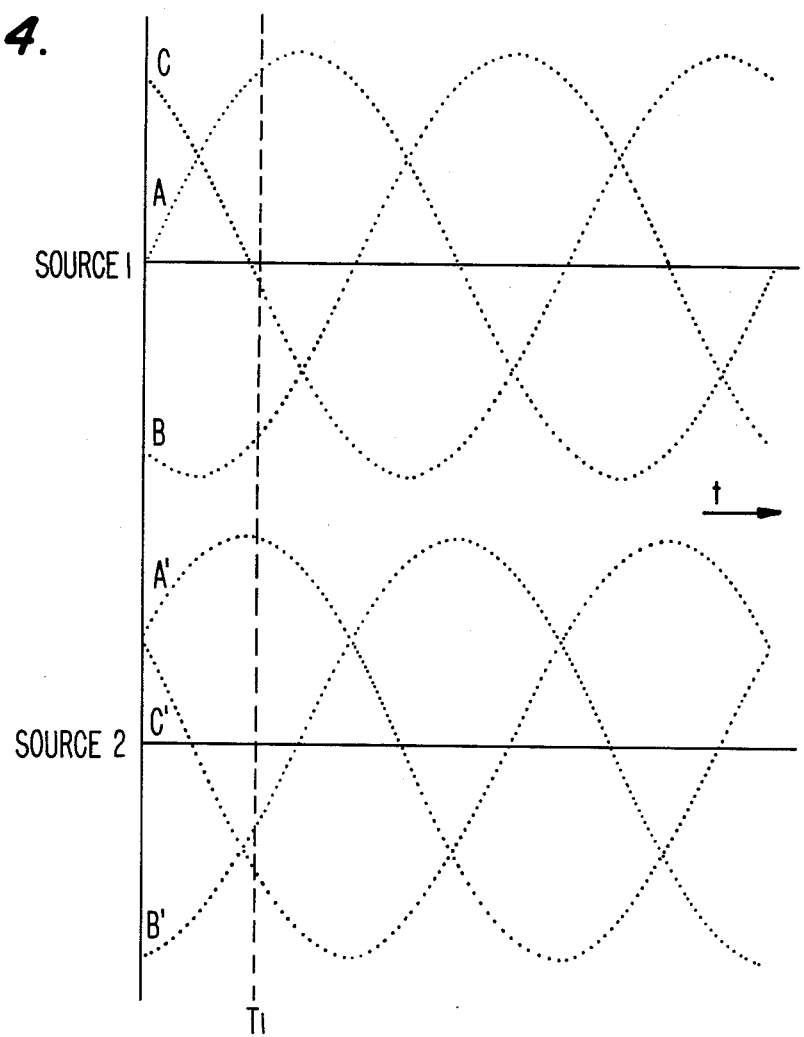
FIG. 4 illustrates the phases of source 1 and the phases of source 2 which are not aligned in time, therefore the sources are not synchronized.

In the functional block diagram of FIG. 1 the phases are labeled A, B and C on source 1, and A', B' and C' on source 2. The phase rotation of source 1 is A-B-C-A-B-C-A, etc. The phase rotation of source 2 is A'-B'-C'-A'-B'-C'-A', etc. The power sources are independent of each other: the phases of source 1 are not necessarily aligned in time with the phases on source 2 (see FIG. 4).

Normally, only one power source supplies energy to the load at any given time. When the load is transferred from one power source to the other, the power source that supplies energy to the load before the time of transfer is called the "old" source. The power source that the load is being transferred to is called the "new" source.

2. LOAD—The intended load in this specific design requires uninterrupted power and cannot tolerate peak phase-to-phase voltages below 108V for more than 50 microseconds. The load phases are labeled as L1, L2, L3. Power phase rotation at the load is L1-L2-L3-L1-L2-L3-L1, etc.

Figure 5:
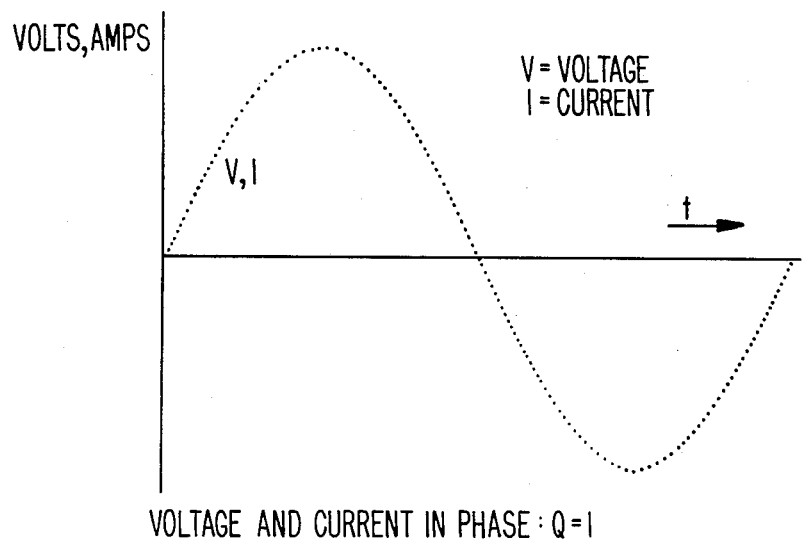
FIG. 5 illustrates the voltage and current in phase for Q equals 1.
Figure 6:
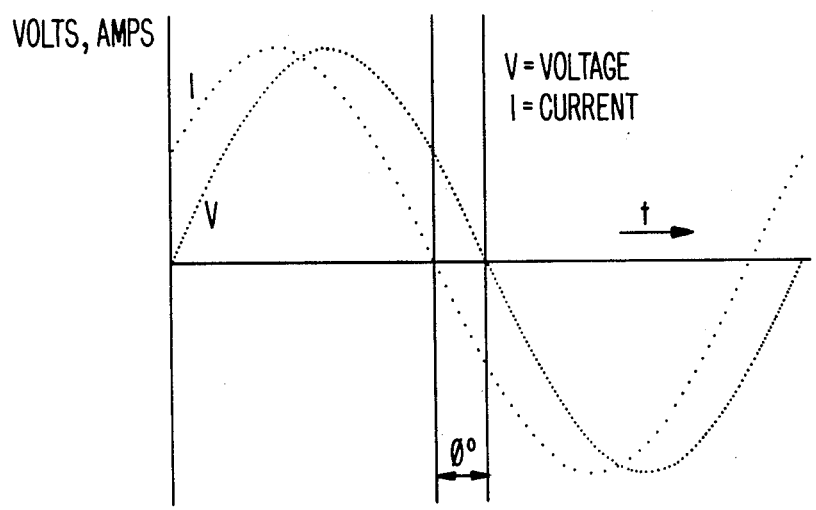
FIG. 6 illustrates the current leading the voltage where the power factor Q equals the cosine ($\phi$).
Figure 7:
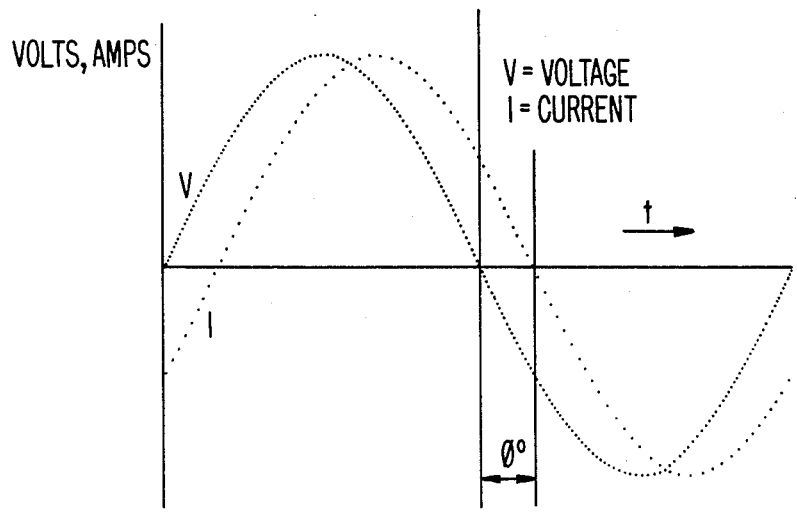
FIG. 7 illustrates the current lagging the voltage where the lagging power factor Q equals the cosine ($\phi$).

The load may have capacitive or inductive elements, causing a leading or lagging power factor up to 0.8. The power factor Q is defined as the cosine of the angle between a voltage and its associated current. For a purely resistive load the current waveform is in phase with the voltage (power factor equals 1.0 as in FIG. 5). For a capacitive load the current leads the voltage as in FIG. 6, and for an inductive load the current lags the voltage (see FIG. 7).

Figure 8:
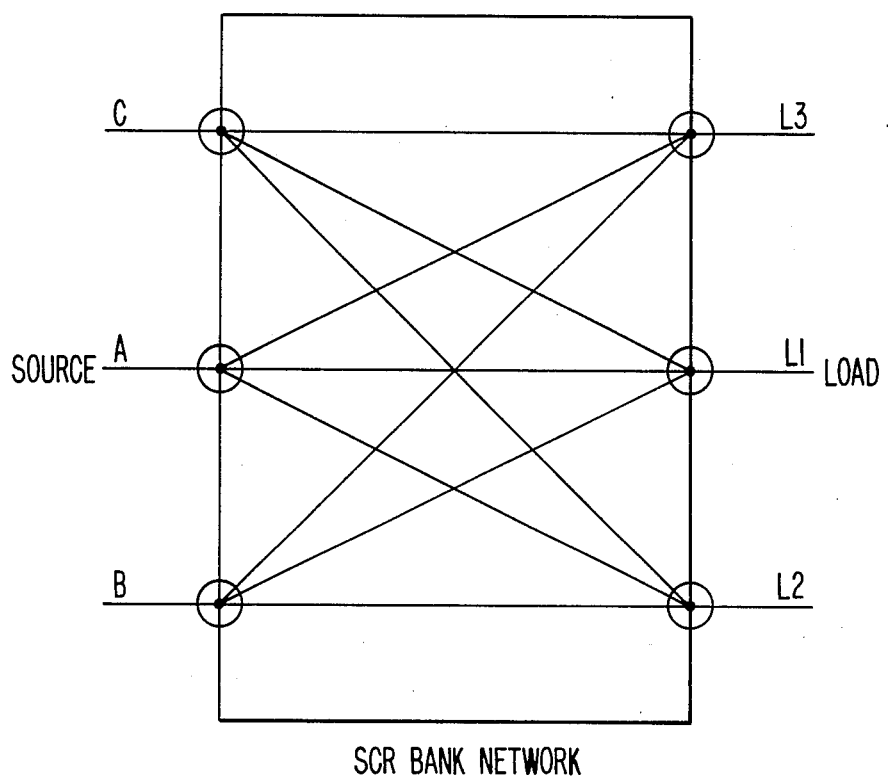
FIG. 8 is a schematic diagram of an SCR bank network.

3. SCR BANK 1,2—Each SCR (silicon controlled rectifier) bank (SCRB) connects the three load phases to one of the two power sources (see FIG. 1—functional block diagram). Each SCRB contains nine lines which interconnect each phase of the power source to every phase of the load (see FIG. 8). At any given time, only three of the nine lines are conductive. This allows the three phases of the power source to be connected to the three phases of the load in several different configurations, however, only three of these configurations are valid (see FIG. 9). These are the three configurations that maintain the phase rotation between the power source and the load. For example, suppose we wish to connect phase A of the power source to phase L2 of the load. We know that at the power source, phase B follows phase A, and that at the load, phase L3 follows phase L2. Therefore we connect phase B to phase L3. Similarly, we know that phase C must be connected to phase L1. This is configuration 2 shown in FIG. 9.

Figure 10:
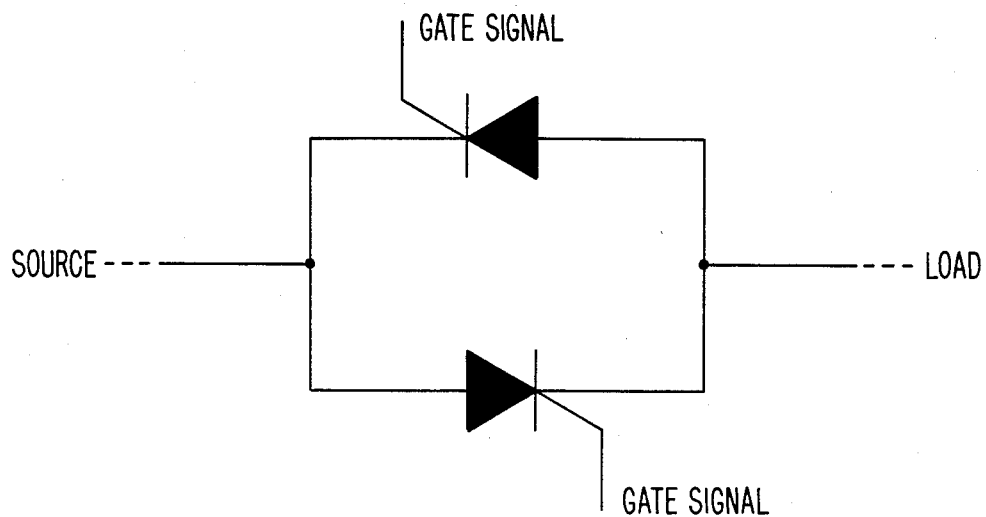
FIG. 10 is a circuit diagram of parallel and opposed SCRs allowing bidirectional current control.

The lines to be selected are determined by the control unit (section 11) and driven by the SCR driver (section 4). A line can be gated to conduct energy either unidirectionally or bidirectionally. This bidirectional current control is accomplished by individually controlling two parallel and opposing SCRs on each line (see FIG. 10). An SCR requires a low energy gate signal to make it conductive. Once triggered, an SCR will conduct current with no further need for the gate signal. To turn off an SCR, the gate signal must be absent and the current through the SCR must be reduced to some minimum value. This minimum current needed to support conduction is called the sustaining current and is typically a few percent of the SCRs' rated current.

Figure 9:
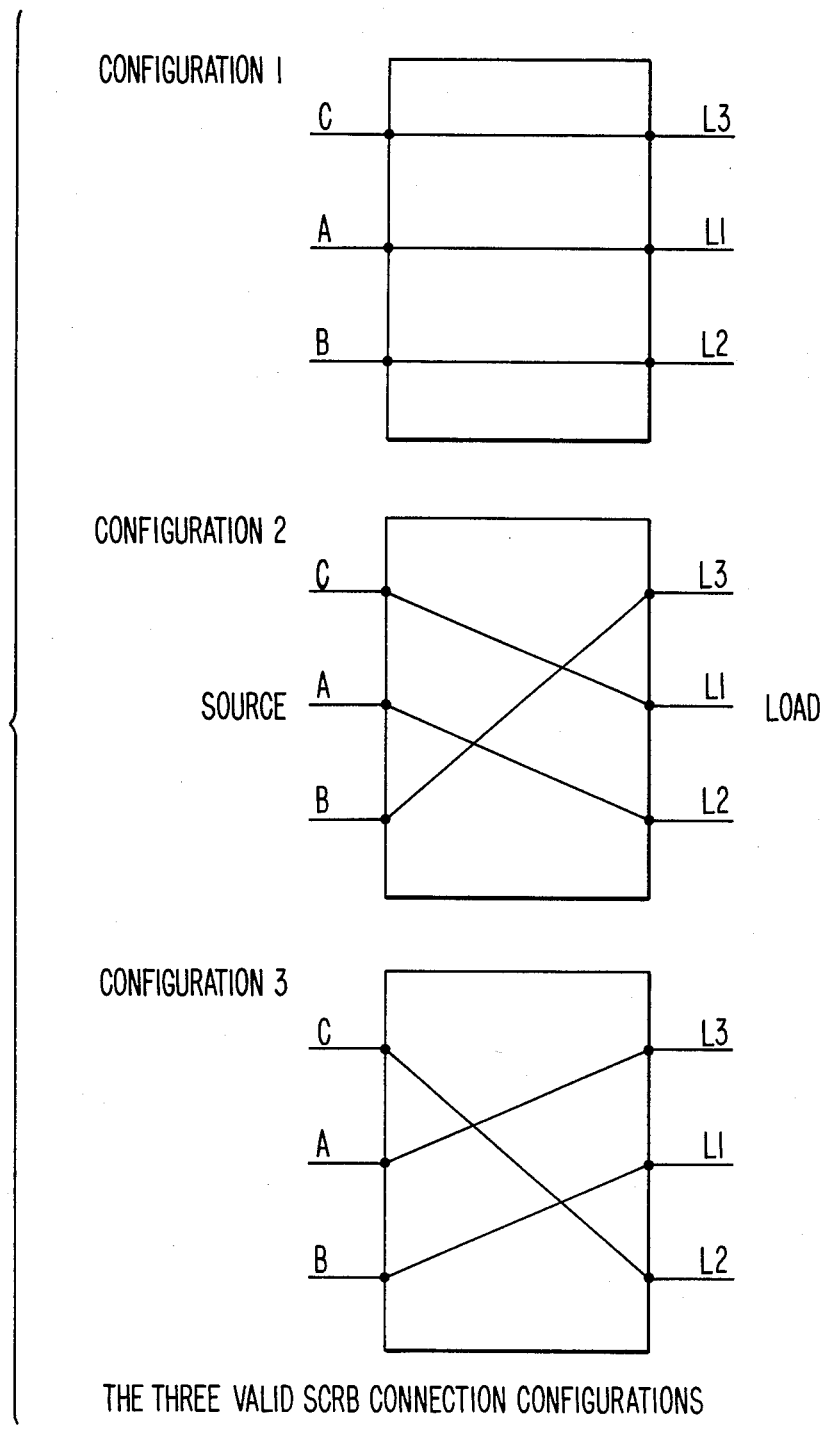
FIG. 9 is a schematic diagram of the three valid SCR bank connection configurations.
Figure 30:
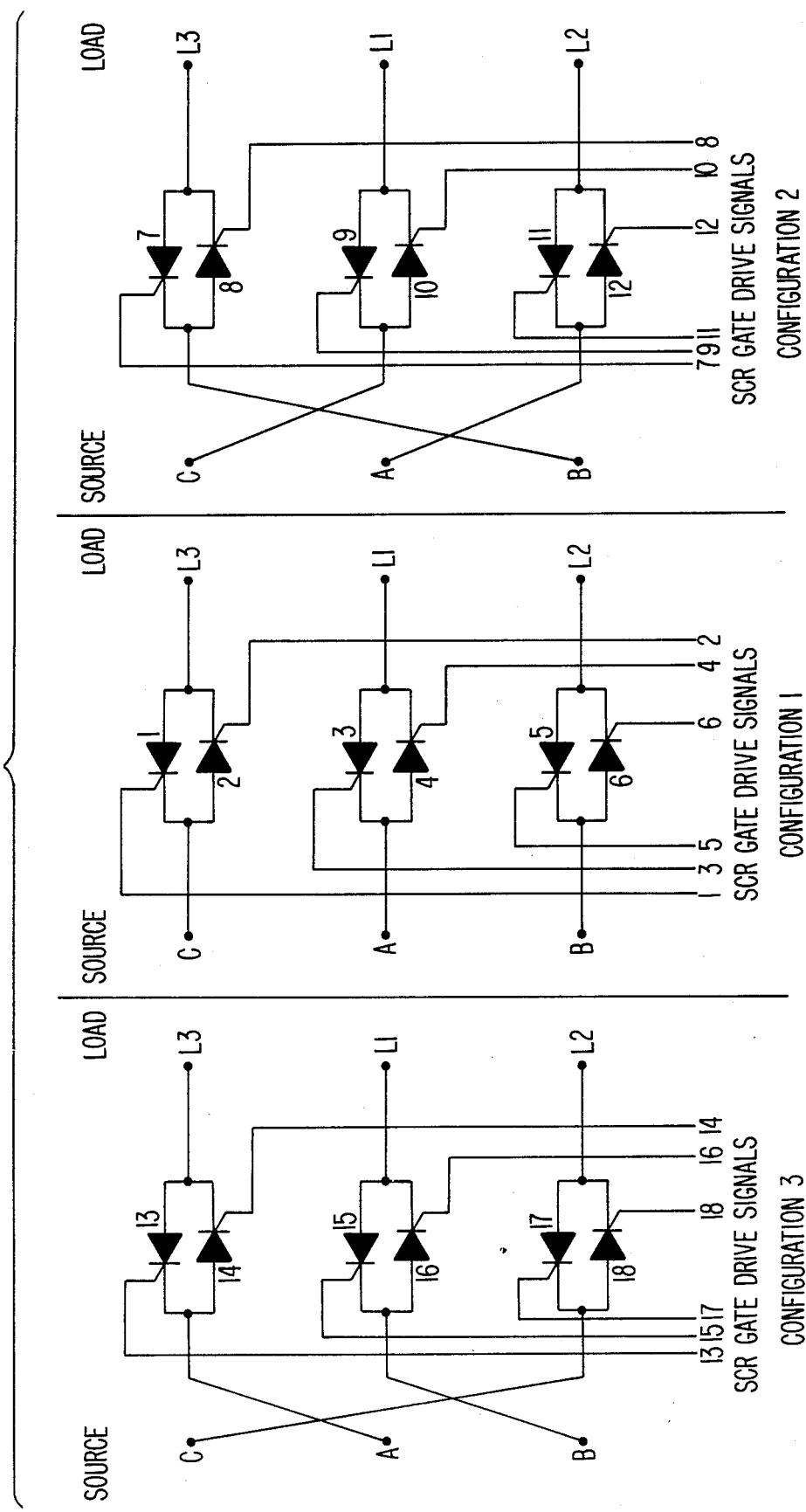
FIG. 30 is a schematic diagram of one of the two SCR banks.

FIG. 30 is a more detailed circuit schematic diagram of the SCR bank, showing the interconnection of the 18 SCR devices in one bank for configuration 1, configuration 2 and configuration 3, corresponding respectively to the path descriptions shown in FIG. 9 for configuration 1, configuration 2 and configuration 3. The nodes A, B and C for each configuration in FIG. 30 are connected in common and the nodes L1, L2 and L3 for each configuration are connected in common. By selectively applying a gate drive signal on the gate input line for a respective SCR device, the SCR device will be rendered into a conductive state as has been previously described.

4. SCR DRIVER 1,2—Each SCR driver (SCRD) provides the gate drive signals to the SCRs in one of the SCR banks (SCRB). The drivers are optically coupled to provide high electrical isolation. The SCRD receives its SCR gate driving scheme from the control unit (section 11).

During normal operation, one power source is connected to the load and the SCRD is driving six SCRs; one for the two directions on each of the three gated lines in the SCRB. The driver switch (section 10) activates the SCRD selected by the control unit or toggles the SCRDs to cause a load transfer from one power source to the other.

5. COINCIDENCE DETECTOR—The coincidence detector (CD) is a part of the SCR steering mechanism. The CD continually monitors the phase relationship between the voltages on the new power source and the load.

The CD receives the three phase voltages A, B and C from both power sources and one phase voltage from the load (designated as the "master waveform"). The control unit selects one of the two power sources (the new power source) to be compared with the master waveform. The CD determines which one of the three new voltage waveforms most closely matches the master waveform. The control unit utilizes this information to determine which of the three connection configurations of FIG. 9 (see section 3) is the most favorable to engage should a transfer between the two power sources be initiated. This determination is constantly updated, allowing load transfers to be made instantaneously, since no additional processing is needed when the transfer is initiated.

Figure 11:
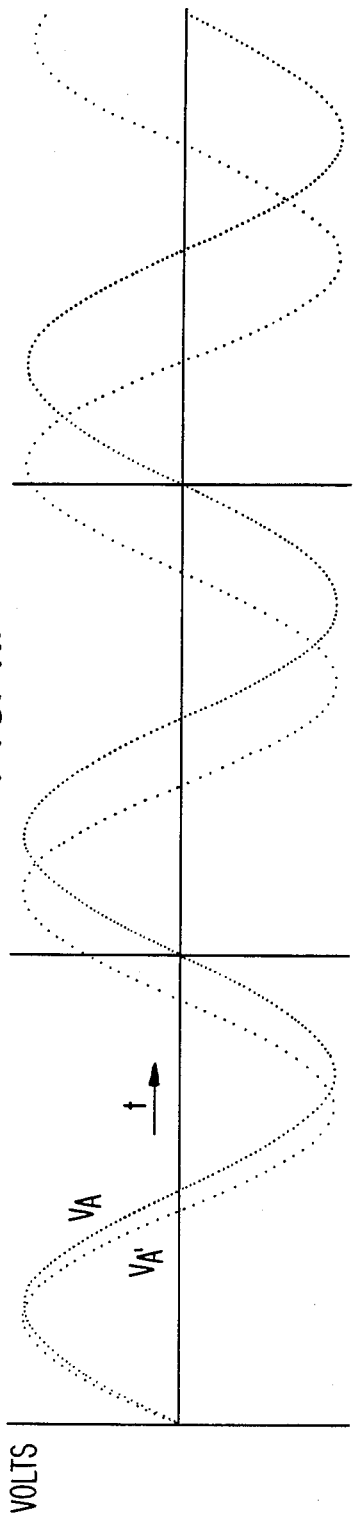
FIG. 11 is an illustration of the phase difference variation over time for a single phase between two, three phase sources with different frequencies.

The CD is necessary because the two power sources are not always synchronized. This lack of synchronization may exist because the frequency and loading of the power sources are independent. The frequency of each source may vary independently by as much as +/−5%. As time progresses, a frequency difference between the two power sources will cause a varying phase difference between the voltage waveforms of the two power sources (see FIG. 11).

When a transfer of the load from one power source to the other is initiated, it is necessary to maintain the three voltage waveforms and the phase rotation of the load. The phase rotation of the load and new source are known from the phase rotation detector (see section 7), and the CD has selected the new phase which most closely matches the load master waveform. This provides the control unit with all of the information necessary to choose the most favorable connection configuration.

As an example, suppose that the load phase rotation is L1-L2-L3-L1-L2-L3-L1, etc., and the new power source phase rotation is A-B-C-A-B-C-A, etc. Also suppose that the load master waveform corresponds to phase L1 and it has been determined that this master waveform most closely matches phase C on the new source. We then connect L1 to C, L2 to A, and L3 to B at the time of transfer (refer to FIG. 9).

Figure 28:
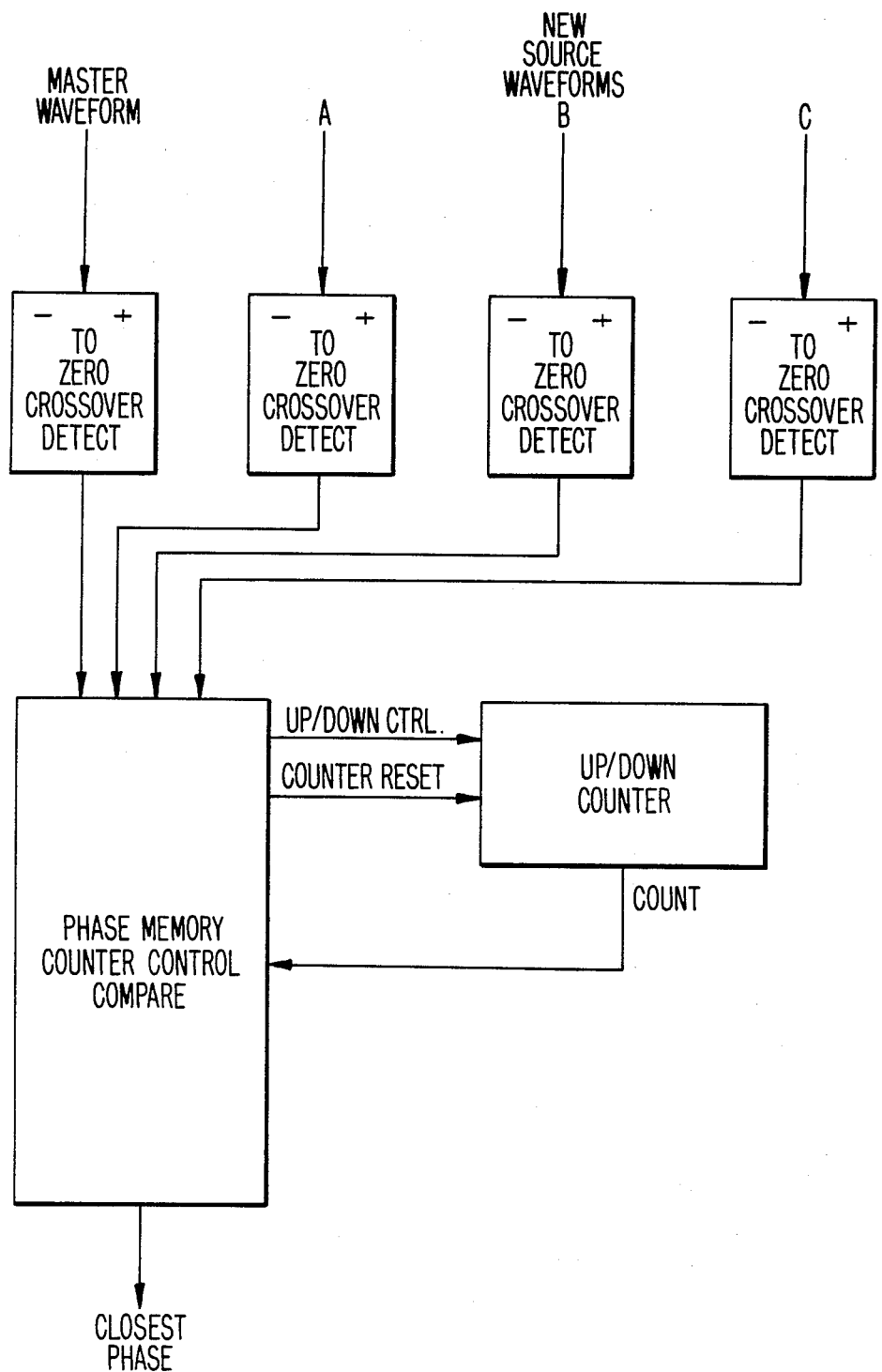
FIG. 28 illustrates the waveform coincidence detector circuit.

A specific example of a waveform coincidence detector is shown in FIG. 28. It uses voltage zero crossovers to toggle an up-down counter and select the smallest relative phase difference.

Coincidence Detector Circuitry

To determine the phase relationship between the two power sources, a timing device can be used to monitor the voltage zero crossover points. The master wave at the load (see section 5) is used as a reference sine wave voltage. The points where this waveform crosses through zero volts are digitally compared with the three voltage waveforms of the new source. The waveform with the zero crossover point nearest to the master waveform's, is the closest match.

In order to determine the nearest zero crossover, a gated up-down counter is used. Each time a new source phase voltage crosses through zero from negative to positive, the counter is started counting up and the phase is stored in the phase memory. If the next negative to positive zero crossover is by another new phase voltage, the counter is reset and started again. If the next negative to positive zero crossover is by the master waveform, the counter is reversed and starts to count down.

Following the master waveform zero crossover, the next negative to positive zero crossover will be by one of the new phase voltages. After the up-down counter's direction has been reversed, the next new phase voltage to cross over zero from negative to positive causes the counter to be stopped and the count is sampled. If the count is greater than zero, the waveform that stopped the counter is the closest match to the master waveform. If the count is less than zero, the last waveform that crossed zero from negative to positive before the master waveform is the closest. If the count is zero, both of the new waveforms are equally close to the master waveform.

When the count is sampled, the counter is reset and begins counting up, and the phase is stored. This process allows the closest new waveform to be determined once every cycle.

6. CURRENT SENSOR 1,2—The current sensors (CS) (labeled "I Sense" in FIG. 1) monitor the sense (+/− or 0) of the three phase currents on each power source. This information is provided to the control unit (section 11).

Since the AMSG is a make-before-break switch, care must be taken not to tie the old and new power sources to the load in such a manner that current is able to flow between the power sources.

Allowing each phase leg on the new power source to conduct only in the same direction as the phase leg on the old power source that it is replacing, eliminates the problem. As soon as the current in the old phase leg goes to zero (the old SCR turns off), the remaining SCR on the new phase leg is driven on, as will be described in the section on operation of the invention (operation).

7. PHASE ROTATION DETECTOR 1,2—One phase rotation detector (PRD) monitors the phase rotation on each power source. The PRD is used before the load has been powered up (both power sources are disconnected). A reversed phase rotation indicates a serious fault, such as the miswiring of an alternator circuit. In this case, the fault would need to be corrected before operation could proceed.

The PRD sends a phase rotation good/bad signal to the control unit (section 11). The control unit prohibits a power source from being connected to the load if its rotation is reversed.

8. GO/NOGO 1,2—Each go/nogo unit (GNG) monitors the three phase voltages of its associated power source and provides a voltage go/nogo signal to the control unit (section 11). If the peak voltage of a power source is below a certain threshold level, the GNG unit signals a nogo state for that power source. If the peak voltage of a power source is at or above the threshold, the GNG unit signals a go state. The control unit interprets the voltage go/nogo signal as indicating whether or not the load can be connected to that power source (see section 11B).

9. EVENT DETECTOR 1,2—The event detector (ED) monitors the three phase voltages at the load terminals. An "event" is defined as a power failure due to the voltage dropping below a certain threshold level, which may happen in one of three ways. The voltage may show a sudden reduction on all three phases, the voltage on a single phase may be lost completely, or the voltages on all three phases may begin to gradually decay or "droop."

A sudden reduction would be caused by the tripping of a breaker, the loss of a phase could be caused by a wiring fault, and the decay of voltages would occur if the generator began to wind down as the result of some prime mover failure.

The ED provides an event signal to the driver switch (section 10) and the control unit (section 11). This signal initiates an automatic load transfer between power sources if an event is detected. The control unit has the ability to enable and disable the ED.

10. DRIVER SWITCH—The driver switch (DS) activates the selected SCR driver (SCRD). This selection is made by the control unit (section 11). The event detector (ED) can toggle this selection when enabled by the control unit. Only one SCRD is active at any given time, and the DS informs the control unit of the currently active SCRD.

The control unit makes SCRD selection by telling the DS which SCRD to activate (see section 11B). When the ED is enabled, the event signal from the ED to the DS acts as a toggle, causing the DS to activate the new SCRD and deactivate the old SCRD.

11. CONTROL—The AMSG control unit functions are provided by a microprocessor shown in FIG. 29 and are grouped into four categories: SCR selection, driver switch control, transfer recovery, and manual operation.

FIG. 29 illustrates the microprocessor of the control unit. The microprocessor includes a CPU chip such as an Intel 8080 eight-bit processor connected by means of a common bus to a random access memory (RAM) and a read only memory (ROM). Also connected to the common bus is a keyboard and an input/output (I/O) unit which enables the communication between the control unit and the various elements shown in the system block diagram of FIG. 1. The functions of SCR selection, driver switch control, transfer recovery and manual operations are embodied as encoded instructions which are stored either in the ROM or the RAM and are executed as appropriate by the CPU, to enable the intercommunication through the I/O unit to the balance of the elements in the system of FIG. 1. In manual operation, the operator can make data entry at the keyboard which is then stored in the RAM for supplying operational parameters and other information necessary to carry out customized power transfer operations. As will be described later, the programs of stored instructions carry out operations such as the transfer on detection of event which is illustrated in the flow diagram of FIG. 31. The signals input to and output from the I/O unit are typically digital signals which are converted by analog-to-digital and digital-to-analog converters for appropriate interfacing with analog components in the system of FIG. 1.

A. SCR SELECTION

The control unit provides the steering signals to the SCR drivers (SCRD). For the old power source, the control unit selects bidirectional SCR gating for the particular connection configuration. For the new power source, the control unit selects unidirectional SCR gating for the appropriate connection configuration.

The control unit determines the appropriate connection configuration for the new power source from information provided by the coincidence detector (CD), and determines the SCR gating direction from the current sensor (CS). The CD tells the control unit which phase on the new source most closely matches the master waveform at the load. Each of the three master-to-new-phase matches, corresponds to one of the three possible connection configurations (refer to FIG. 9).

The CS tells the control unit the direction of the current on each line of the old power source's connection configuration. The control unit enables only the SCRs on the lines of the new power source connection configuration which correspond to the direction of the current on the old power source legs.

B. DRIVER SWITCH CONTROL

The control unit selects the SCRD to be activated by the driver switch (DS). If a power source is not in the go state (see section 8), or if its phase rotation is reversed (see section 7), its SCRD will not be selected (i.e. the source will not be connected to the load).

At load power up, a preferred power source may or may not be designated by the manual control. If a preferred source has been designated, the control unit selects that source's SCRD if and when the source reaches the go state. If the source is already in the go state, the selection occurs immediately. If neither power source has been designated, the control unit selects the SCRD of the first power source to reach the go state, or a predetermined power source if both sources are already in the go state.

The control unit enables the event detector (ED) only when both power sources are in the go state, allowing a load transfer from the old to new power source if an event occurs. When a load transfer takes place due to an event, the control unit is informed via the event signal from the ED and disables the ED from initiating further transfers until it is manually reset (see section 11D). This is done because a power source which has gone bad may appear to recover when the load is disconnected. A transfer back to this source would be undesirable.

C. TRANSFER RECOVERY

The control unit identifies the old and new power sources by looking at which SCR driver (SCRD) is activated. This information is provided to the control unit by the driver switch (DS). The power source whose SCRD is currently activated is the old source, and the power source whose SCRD is not activated is the new source. The control unit selects the new power source for comparison with the master waveform in the coincidence detector (CD). The control unit also looks at the old power source's current sensor (CS) information to determine the SCR gating direction on the lines of the new source's connection configuration (see section 11A; operation).

When a load transfer between power sources occurs, the old and new sources are swapped. Consequently, the "new" new source is automatically selected by the control unit for comparison to the master waveform. The control unit will also begin to utilize the "new" new source's CS information to determine the appropriate SCR gating direction.

When an event signal originates a load transfer between power sources, the control unit is initially driving only one SCR on each leg of the new source's connection configuration. The control unit waits for the current in each leg of the old connection configuration to go to zero before it drives the remaining SCR on the corresponding new leg (see section 6; operation). In addition, the control unit disables the event detector (ED) (see section 11B).

D. MANUAL OPERATION

The control unit may receive operating instructions from the manual control (MC). Before load power up, the connection of the load to a power source is arbitrated by the MC. Through the MC, a preferred power source may or may not be selected (see section 11B). The MC can also initiated load transfers between the power sources. Manual load transfers are allowed at any time, regardless of the status of the power sourced (see section 11A).

In all cases, the MC is disabled during load transfers, to prevent contention between control signals. This prevents a load transfer from being interrupted. Once a load transfer due to an event has occurred, the event detector (ED) is disabled (see section 10; section 11B; operation). Through the MC, the ED can be reset, provided both sources are in the go state. The MC will include a display that indicates the status of the various AMSG system blocks. These indicators include go/- nogo, event, and phase rotation indicators.

OPERATION OF THE INVENTION

Load Transfer Sequences

Figure 12:
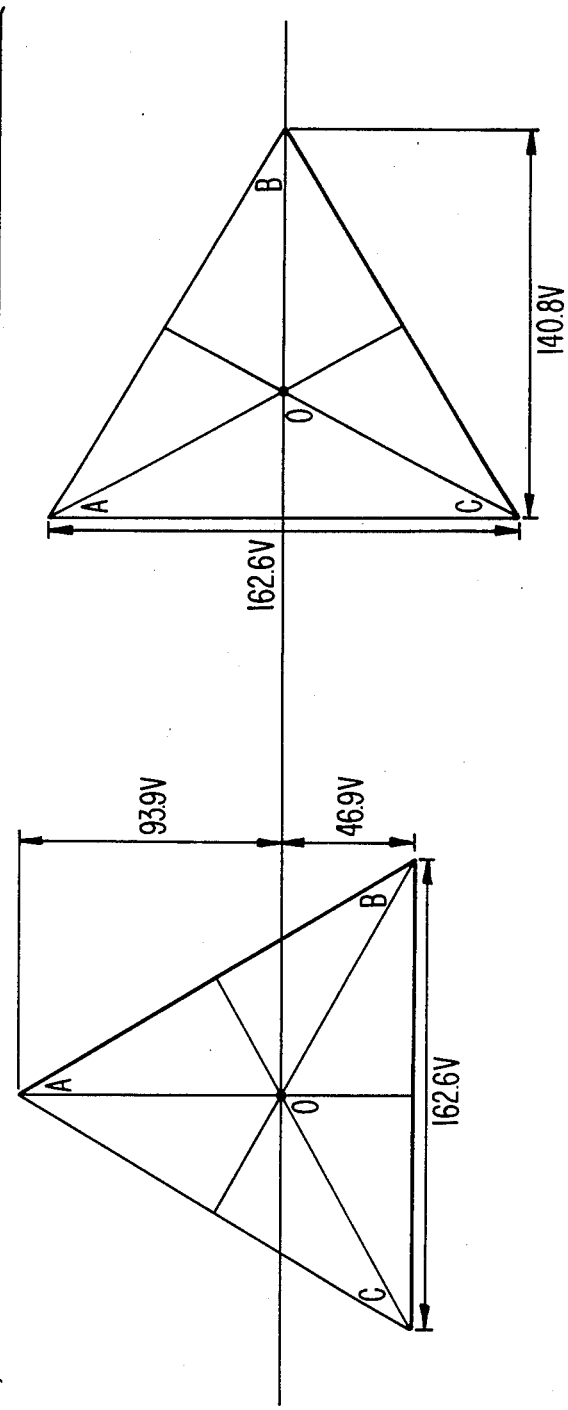
FIG. 12 illustrates the three phase voltage source where each vertex of a triangle corresponds to one of the phases A, B C.

The three phase voltage source for a specific design is shown graphically in FIG. 12. Each vertex of the triangle corresponds to one of the phases: A, B or C. The peak phase-to-phase voltage is the distance along one side of the triangle. The minimum phase-to-phase voltage is the distance from a vertex to the midpoint of the opposite side. In FIG. 12, these two voltages are shown as 162.6V and 140.8V, respectively.

Figure 13:
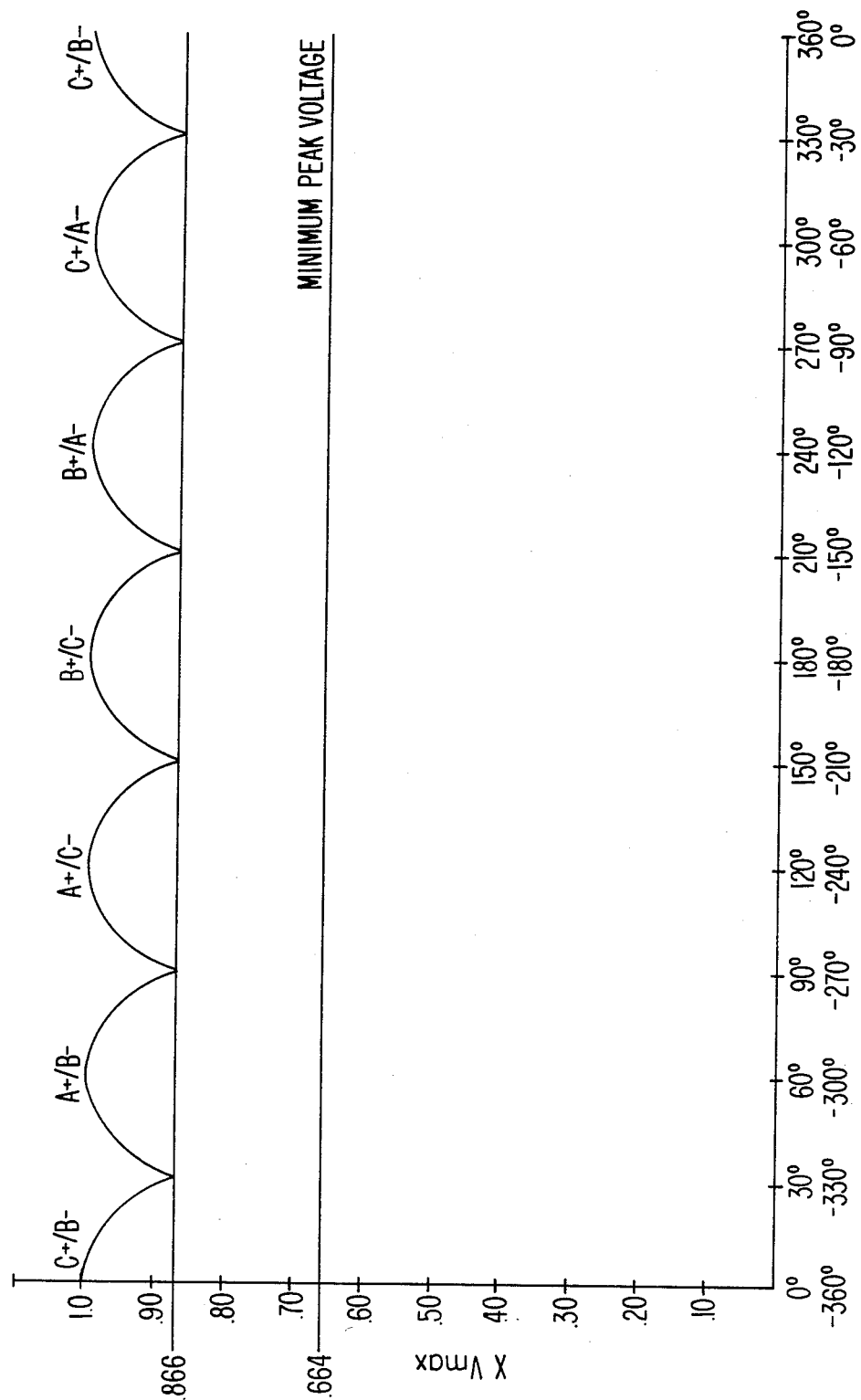

As time advances, the triangle of FIG. 12 rotates counterclockwise about point O at the frequency of the source (60 Hz in this specific design). The maximum phase-to-phase voltage over a 360 degree rotation is shown in FIG. 13, and labeled to show which two phases the voltage is measured between. Also shown is the minimum peak voltage required by the load for this design.

Figure 14:
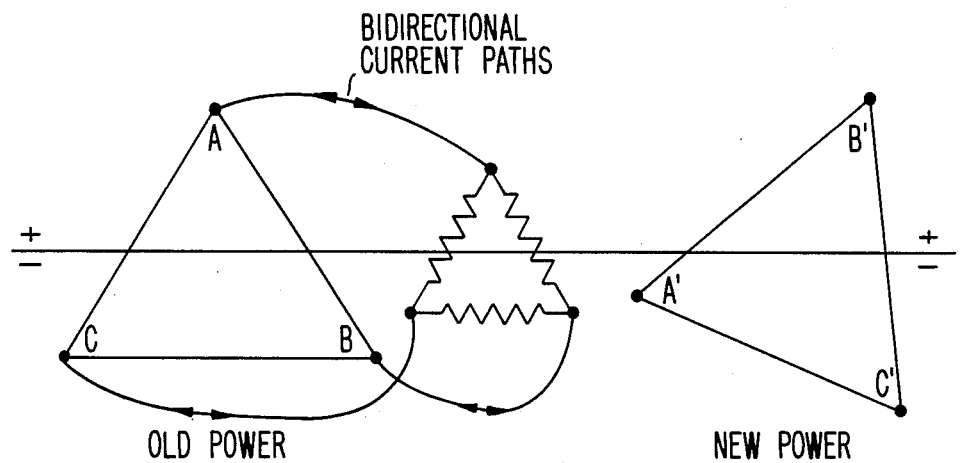
FIG. 14 is a graphical representation of how a source is connected to a load.

A graphical representation of how a source is connected to a load is shown in FIG. 14. The lines between the source and load correspond to the lines in one of the SCR bank (SCRB) connection configurations discussed in section 3. The arrows on each line indicate in which direction the SCRs are gated to allow conduction. In FIG. 14, the lines are gated bidirectionally. This represents a normal operating condition, where energy is supplied to the load by one power source.

Figure 15:
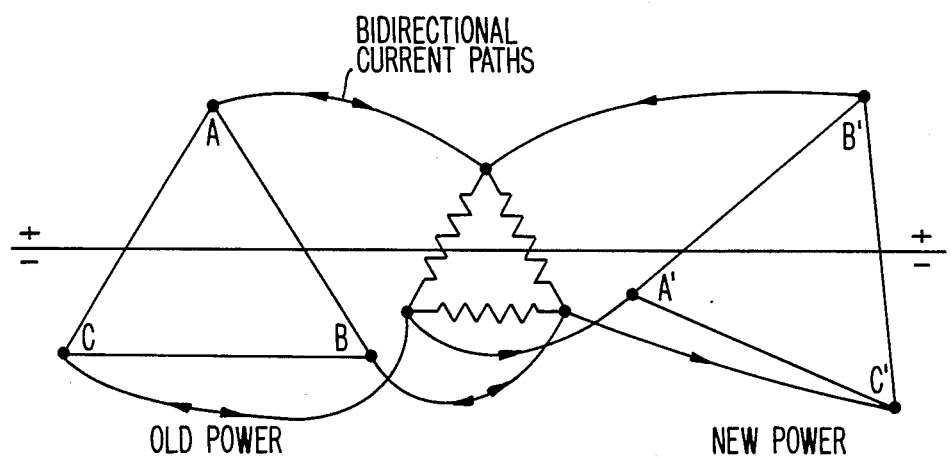
FIG. 15 shows the two power sources connected to the load.

FIG. 15 shows the two power sources connected to the load. Prior to a load transfer, the old source is supplying energy to the load. Therefore, both SCRs on each line of the old connection configuration are gated to conduct. The new power source in FIG. 15 is out of phase with the old power source. Each phase on the new power source is shown connected to the load phase which most clearly matches it (the load phase voltages are the same as those of the power source supplying it with energy). In addition, each line in the new power source's connection configuration is gated in the direction of the current on the corresponding old phase. Note however, that the SCRs in the new configuration are not selected to be driven (see section 10; section 11). This situation exists when the old power source is supplying energy to the load, and neither an event nor a manual command has initiated a load transfer.

Figure 16:
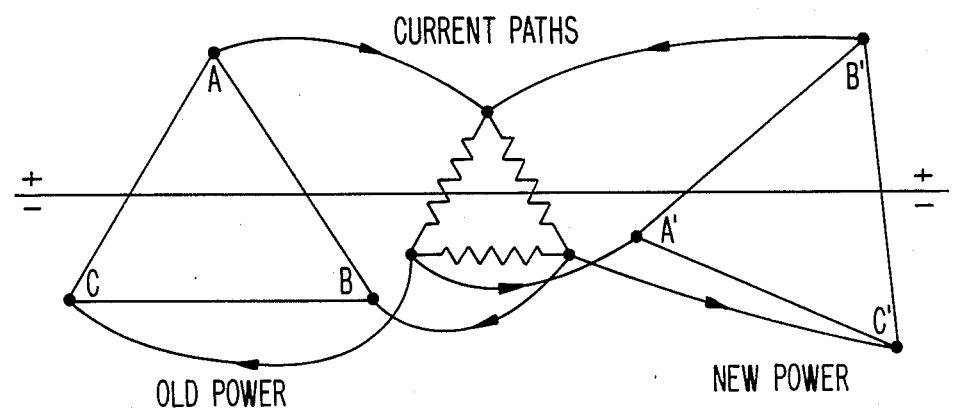

When a load transfer is initiated (see section 9; section 11), the SCRs of the old connection configuration are deselected. At the same time, the SCRs of the new connection configuration are selected (see section 10; section 11). Only the old SCRs that were conducting will remain on. This is shown in FIG. 16. As the current in the old SCRs reduces to zero they turn off, and the remaining new SCRs are gated. This load transfer sequence is summarized as follows:

1. Event is detected:
   A. Deselect old SCRs. Currently conducting old SCRs will remain on.
   B. Select new SCRs.
2. Current in old SCRs reduces to zero:
   A. Old SCRs turn off.
   B. Gate remaining new SCRs.

The SCRs are selected and deselected via the SCR drivers (SCRD) (section 4) and the driver switch (DS) (section 10), under control of the control unit (section 11). The current in the old SCRs will go to zero in one of three ways. It may go to zero naturally at the next current zero crossover, it may be forced to zero if the new voltage is more favorable to sustain the current, or it may go to zero as the result of a voltage "droop."

Description of Flow Diagram for Transfer on Detection of Event

FIG. 31 illustrates a flow diagram which is a sequence of operational steps to carry out the transfer of connection of the load from an old power source to a new power source based upon the detection of a failure event. The flow diagram of FIG. 31 represents a sequence of operational steps which are encoded in computer instructions which are stored in the RAM or ROM of the microprocessor in the control unit. When the instructions are executed by the CPU, the functions depicted in the flow diagram of FIG. 1 are performed.

The flow diagram of FIG. 31 is divided into two major portions; the first portion consisting of Steps 20 through 30 is a wait loop wherein the system cyclically waits for an event to occur and during the waiting interval, cyclically monitors for conditions in the system shown in FIG. 1. The second major portion of the flow diagram of FIG. 1 consists of Steps 32 through 46 which result from the detection of an event such as a failure of the old power source, and results in the carrying out and completion of the transfer of connection of the load device from the old power source to the new power source.

In the wait loop portion of FIG. 31, Step 20 starts the loop wherein the system waits for the event to occur. In Step 22, the coincidence detector monitors the phases of the new power source with respect to the master waveform, as previously described. In Step 24, after the coincidence detector and control unit have identified the phase of the new power source which most closely matches the master waveform, the identity of the configuration for the SCR bank (FIG. 30) which corresponds to that closest match, is stored in the RAM of the microprocessor in the control unit. If the master waveform is considered to be the L1 terminal of the load, and if the A phase of the new power source is found to most closely match the master waveform, then configuration 1 of FIG. 30 is identified as the configuration to be stored in the RAM. In this illustration, the old power source is source 2 in FIG. 1 and the new power source is source 1.

In the flow diagram of FIG. 31, the currents from the old power source 2 are monitored by the current detector I sense 2 of FIG. 1 and the polarity and magnitude (zero or not zero) of the current in each line A', B' and C' are stored in the RAM of the microprocessor of the control unit, as is designated by Step 28 of FIG. 31. Typically, the wait loop in the flow diagram of FIG. 31 would be repeated frequently enough to maintain valid tracking of the phase and current values being monitored.

The event detector of FIG. 1 monitors failure events which can occur in the system. When the event detector has detected a failure condition for the old source 2, it signals the control unit of the failure condition. Step 30 in the flow diagram of FIG. 31 determines that the failure condition exists and therefore the flow diagram of FIG. 31 branches to Step 32 where all of the old SCR gate drives are turned off through the SCR driver 2. Then in Step 34, the RAM in the microprocessor is read for the last current values of the lines A', B' and C' from the old source 2. In the next Step 36, the RAM is then read for the pattern for configuration of the SCR bank 1, which corresponds to the closest phase match to the master waveform. In this example, the A line for the power source 1 has been previously determined in the wait loop, to be the closest match to the master waveform on the load terminal L1. Next, Step 38 of FIG. 31 makes use of the phase matching data read from the RAM during Step 36. Configuration 1 for the SCR bank of FIG. 30 has the A line of power source 2 coupled to the L1 terminal of the load. Further assume that the last monitoring of currents into the load showed that the L1 terminal and the L2 terminal had current flowing into the load and the L3 terminal had current flowing out of the load. In response to these determinations, Step 38 turns on the first half of each new pair of SCRs in the SCR bank 1 so that the resulting currents supplied by the new source 1 supplement the old currents from the old source 2. In order to do this, the SCR gate drive signals on lines 1, 4 and 6 are turned on at substantially the same time. This renders the respective SCRs in a conductive state so that when their anode is relatively more positive than their cathode, they will begin conducting current from the new source 1 into or out of the load, as required in this example.

Step 40 of the flow diagram of FIG. 31 continues monitoring the decaying currents in the old lines A', B' and C' in order to determine when it is appropriate to turn on the second half of each pair of SCRs in the new SCR bank 1. As the current decays in each line A', B' and C' from the old source 2, the first current to decay substantially to zero will cause the corresponding SCR pair to have its second SCR turn on. Assume in this example that the current in line A' goes to zero first. Then, at this point SCR gate drive signal line 3 would be enabled and the SCR 3 would be rendered into a conductive state so that the path from line A to the terminal L1 becomes a bidirectional path, as provided in Step 42 of the flow diagram of FIG. 31.

Next, the second and third lines B' and C' will decay to substantially zero current at approximately the same time. When the current detector I sense 2 makes this determination, the control unit causes the SCR driver 1 to apply SCR gate drive signals on the remaining two SCR gate drive lines 2 and 5, thereby rendering the SCRs 2 and 5 in a conductive state so that when their respective anodes have a more positive potential than their cathodes, they will begin conducting current thereby making their corresponding paths bidirectional.

In this manner, the transfer of power sources from source 2 to source 1 is completed, as is provided by Step 46.

When a load transfer takes place, several different situations may exist. The new voltage may lead or lag the old voltage, the old current may lead or lag the old voltage, or the old current may lead or lag the new voltage.

Following, each possible combination of leading and lagging voltages and current are graphically represented. The graphs have been divided into zones with a written description of what happens during a load transfer sequence initiated in that zone. Only a single phase is shown in each case, but all three phases of the power source will be in one of the zones of one of the cases.

Each zone description begins by describing which voltage (old or new) sources or sinks the load, and when the old current goes to zero, assuming that both power sources are good. After this, the voltage "droop" situation is described. The situation where the voltage drops out suddenly is not described, because in all cases, the old current would immediately go to zero, and the new power source would take over the load.

In the following example cases the variables V, I and V' represent:
V = Old voltage.
I = Old current.
V' = New voltage.

| Case 1 is represented in FIG. 17. | |
|---|---|
| Case 1: | New voltage in phase with old voltage. Old current in phase with old voltage. |
| A. | V' shares the load with V. I goes to zero at T1. |
| | If V drops below V', V' sources the load. I goes to zero immediately. |
| B. | V' shares the load with V. I goes to zero at |

|   |   |
|---|---|
|   | T2. |
|   | If V drops above V', V' sinks the load. I goes to zero immediately. |
|   | *Case 2 is represented in FIG. 18.* |
| Case 2: | New voltage in phase with old voltage. |
|   | Old current lags old voltage. |
| A. | V' shares the load with V. I goes to zero at T1. |
|   | If V drops below V', V sinks the load. I goes to zero before T1. |
| B. | V' shares the load with V. I goes to zero at T2. |
|   | If V drops above V', V' sources the load. I goes to zero immediately. |
| C. | V' shares the load with V. I goes to zero at T2. |
|   | If V drops above V', V sources the load. I goes to zero before T2. |
| D. | V' shares the load with V. I goes to zero at T3. |
|   | If V drops above V', V' sinks the load. I goes to zero immediately. |
|   | *Case 3 is represented by FIG. 19.* |
| Case 3: | New voltage in phase with old voltage. |
|   | Old current leads old voltage. |
| A. | V' shares the load with V. I goes to zero at T2. |
|   | If V drops below V', V sources the load. I goes to zero before T1. |
| B. | V' shares the load with V. I goes to zero at T2. |
|   | If V drops below V', V' sources the load. I goes to zero immediately. |
| C. | V' shares the load with V. I goes to zero at T4. |
|   | If V drops below V', V sinks the load. I goes to zero before T3. |
| D. | V' shares the load with V. I goes to zero at T4. |
|   | If V drops above V', V' sinks the load. I goes to zero immediately. |
|   | *Case 4 is represented by FIG. 20.* |
| Case 4: | New voltage lags old voltage. |
|   | Old current in phase with old voltage. |
| A. | V sources the load. I goes to zero at T2, where the voltages commutate. |
|   | If V decays, but does not drop to zero before T1, the voltages commutate before T2. |
|   | if V decays to zero before T1, I goes to zero when V goes to zero. |
| B. | V sources the load. I goes to zero at T2, where the voltages commutate. |
|   | If V drops below V', V' sources the load. I goes to zero immediately. |
| C. | V' sources the load. I goes to zero immediately. |
| D. | V sinks the load. I goes to zero at T4, where the voltages commutate. |
|   | If V decays, but does not drop to zero before T3, the voltages commutate before T4. |
|   | If V decays to zero before T3, I goes to zero when V goes to zero. |
| E. | V sinks the load. I goes to zero at T4, where the voltages commutate. |
|   | If V drops above V', V' sinks the load. I goes to zero immediately. |
| F. | V' sinks the load immediately. I goes to zero immediately. |
|   | *Case 5A is represented by FIG. 21.* |
| Case 5A: | New voltage lags old voltage. |
|   | Old current lags old voltage. |
|   | Old current leads new voltage. |
| A. | V' sinks the load. I goes to zero immediately. |
| B. | V sources the load. I goes to zero at T2, where the voltages commutate. |
|   | If V drops toward zero, but I does not go to zero before T1, the voltages will commutate before T2. |
|   | If V drops toward zero, and I goes to zero before T1. V' will take over the load when I goes to zero. |
| C. | V sources the load. I goes to zero at T2, where the voltages commutate. |
|   | If V drops below V', V' sources the load. I goes to zero immediately. |
| D. | V' sources the load. I goes to zero immediately. |
| E. | V sinks the load. I goes to zero at T4, where the voltages commutate. |
|   | If V drops toward zero, but I does not go to zero before T3, the voltages will commutate before T4. |
|   | If V drops toward zero, and I goes to zero before T3. V' will take over the load when I goes to zero. |
| F. | V sinks the load. I goes to zero at T4, where the voltages commutate. |
|   | If V drops above V', V' sinks the load. I goes to zero immediately. |
| G. | Same as A. |
|   | *Case 5B is represented by FIG. 22.* |
| Case 5B: | New voltage lags old voltage. |
|   | Old current lags old voltage. |
|   | Old current lags new voltage. |
| A. | V' sinks the load. I goes to zero immediately. |
| B. | V sources the load. I goes to zero at T1, where the voltages commutate. |
|   | If V drops below V', V' sources the load. I goes to zero immediately. |
| C. | V' sources the load. I goes to zero immediately. |
| D. | V sinks the load. I goes to zero at T2, where the voltages commutate. |
|   | If V drops above V', V' sinks the load. I goes to zero immediately. |
| E. | Same as A. |
|   | *Case 6 is represented by FIG. 23.* |
| Case 6: | New voltage lags old voltage. |
|   | Old current leads old voltage. |
| A. | V sources the load. I goes to zero at T2, where the voltages commutate. |
|   | If V drops toward zero, but I does not go to zero before T1, the voltages will commutate before T2. |
|   | If V drops toward zero, and I goes to zero before T1. V' will take over the load when I goes to zero. |
| B. | V sources the load. I goes to zero at T2, where the voltages commutate. |
|   | If V drops below V', V' sources the load. I goes to zero immediately. |
| C. | V' sources the load. I goes to zero immediately. |
| D. | V sinks the load. I goes to zero at T4, where the voltages commutate. |
|   | If V drops toward zero, but I does not go to zero before T3, the voltages will commutate before T4. |
|   | If V drops toward zero, and I goes to zero before T3. V' will take over the load when I goes to zero. |
| E. | V sinks the load. I goes to zero at T4, where the voltages commutate. |
|   | If V drops above V', V' sinks the load. I goes to zero immediately. |
| F. | V' sinks the load. I goes to zero immediately. |
|   | *Case 7 is represented by FIG. 24.* |
| Case 7: | New voltage leads old voltage. |
|   | Old current in phase with old voltage. |
| A. | V sinks the load. I goes to zero at T1. |
|   | If V drops toward zero, I goes to zero before T1. V' takes over load when I goes to zero. |
| B. | V' sources the load. I goes to zero immediately. |
| C. | V sources the load. I goes to zero at T2. |
|   | If V drops below V', V' sources the load. I goes to zero immediately. |
| D. | V sources the load. I goes to zero at T2. |
|   | If V drops toward zero, I goes to zero before T2. V' takes over load when I goes to zero. |
| E. | V' sinks the load. I goes to zero immediately. |
| F. | V sinks the load. I goes to zero at T3. |

|         | -continued                                                                                                                                                     |
| ------- | -------------------------------------------------------------------------------------------------------------------------------------------------------------- |
|         | If V drops above V', V' sinks the load. I goes to zero immediately.                                                                                            |
|         | Case 8 is represented by FIG. 25.                                                                                                                              |
| Case 8: | New voltage leads old voltage. Old current lags old voltage.                                                                                                   |
| A.      | V sinks the load. I goes to zero at T1. If V drops toward zero, I goes to zero before T1. V' takes over the load when I goes to zero.                          |
| B.      | V' sources the load. I goes to zero immediately.                                                                                                               |
| C.      | V sources the load. I goes to zero at T2. If V drops below V', V' sources the load. I goes to zero immediately.                                                |
| D.      | V sources the load. I goes to zero at T2. If V drops toward zero, I goes to zero before T2. V' takes over the load when I goes to zero.                        |
| E.      | V' sinks the load. I goes to zero immediately.                                                                                                                 |
| F.      | V sinks the load. I goes to zero at T3. If V drops above V', V' sinks the load. I goes to zero immediately.                                                    |
|         | Case 9A is represented by FIG. 26.                                                                                                                             |
| Case 9A:| New voltage leads old voltage. Old current leads old voltage. Old current lags new voltage.                                                                    |
| A.      | V sinks the load. I goes to zero at T1. If V drops toward zero, I goes to zero before T1. V' takes over the load when I goes to zero.                          |
| B.      | V' sources the load. I goes to zero immediately.                                                                                                               |
| C.      | V sources the load. I goes to zero at T2. If V drops below V', V' sources the load. I goes to zero immediately.                                                |
| D.      | V sources the load. I goes to zero at T2. If V drops toward zero, I goes to zero before T2. V' takes over the load when I goes to zero.                        |
| E.      | V' sinks the load. I goes to zero immediately.                                                                                                                 |
| F.      | V sinks the load. I goes to zero at T3. If V drops above V', V' sinks the load. I goes to zero immediately.                                                    |
|         | Case 9B is represented by FIG. 27.                                                                                                                             |
| Case 9B:| New voltage leads old voltage. Old current leads old voltage. Old current leads new voltage.                                                                   |
| A.      | V' sources the load. I goes to zero immediately.                                                                                                               |
| B.      | V sources the load. I goes to zero at T1. If V drops below V', V' sources the load. I goes to zero immediately.                                                |
| C.      | V' sinks the load. I goes to zero immediately.                                                                                                                 |
| D.      | V sinks the load. I goes to zero at T2. If V drops above V', V' sinks the load. I goes to zero immediately.                                                    |

The AMSG design performs make-before-break switching of AC power sources to a load requiring an uninterrupted supply of energy. Applications range from those previously stated to telephone and banking activities, where power outages resulting in data losses cannot be tolerated.

The AMSG approach could reduce distribution outages caused by equipment failures for power utilities. Blackouts that have been caused by the loss of power could be handled in a very different manner that would allow alternative paths for routing power to an affected area. With a switching system that can transfer the load without a loss of power, there would be no turn-on surge to affect the new source.

When a power line fails, it is typically one of several feeder circuits to a larger grid supporting the load area. The other feeders cannot absorb the shock of a "cold load" even if the running load was within transmission line kilo volt ampere (KVA) capacity. Using the AMSG can allow the running load to be reallocated without losing "momentum," which would cause the start-up surge. The relative amplitude of this surge is determined by the characteristics of the utilizing loads and commonly ranges from 5 to 10 times the actual load requirement. Incandescent lighting and the starting of motors are two examples of loads found in common usage that have high initial surge characteristics.

If the impending power failure could be detected and acted upon quickly, it is possible to allow the shedding or reallocating of the load to recover without interrupting power. With the freedom to transfer loads quickly from one power source to another, sharing the loads and balancing capacities becomes a simple task. The greatest gain is that there is no need to have the power systems in synchronism to allow switching. Power from several sources can be used with freedom not previously available.

Make-before-break switching has a very important advantage over other switching methods: the load does not see a source interruption at the time of transfer. Because of the reactive nature of the load, when the source of current is broken, inductive recovery effects cause the voltage across the load terminals to spike to potentially damaging values. This effect causes long term stress and degradation of electrical components. Transfer of a load between power sources can cause even greater stress if the time between application of power sources is small, or the phase voltages are inverted, causing a double voltage effect.

AMSG operation never allows the load to see an open circuit, preventing this uncontrolled inductive recovery. The load is never removed from a power source. Instead, it is allowed to propagate from one source to another as the respective phase voltages of the new source assume the load currents. Thus there is a gradual release of loading on the old bus and a ramping up of new bus currents. In high power applications, the reduction of transient spikes becomes a very necessary goal that has large economic benefits.

The AMSG design provides make-before-break AC power switching, asynchronous transfer of power between unsynchronized polyphase sources, and a reduction in switching noise and disturbance to the system during a transfer.

Although a specific embodiment of the invention has been disclosed it would be understood by those having skill in the that the minor changes can be made to the specific embodiment without departing from the spirit and the scope of the invention.

What is claimed is:

1. An asynchronous multiphase switching circuit for transferring the connection of a three phase load from a first three phase power source to a second, independent three phase power source so as to minimize power outage to the load, comprising:

a first SCR bank switchably connecting said load to said first power source and a second SCR bank for switchably connecting said load to said second power source;

a waveform coincidence detector circuit having inputs connected to said second power source and a load master waveform input connected to one terminal of said load, for continuously monitoring the phase relationship between and said one terminal of said load;

a control unit having an input connected to an output from said waveform coincidence detector, and an output connected to said first SCR bank and said second SCR bank, for determining the sequence for connecting the three phases from said second power source to said load through said second SCR bank when said first power source stops supplying power to said load, by determining which phase on said second power source most closely matches the phase of said load master waveform at said one terminal of said load;

whereby the disruption in three phase power being supplied to said load is minimized.

2. An asynchronous multiphase switching circuit for switching a three phase load from an existing three phase power source to a takeover three phase power source, said existing power source having three output voltage terminals whose voltage phase sequence is characterized by an existing phase rotation order, said takeover power source having three output voltage terminals whose voltage phase sequence is characterized by a takeover phase rotation order, comprising:

a first SCR bank having three paths, each respectively connecting each of said output voltage terminals of said existing power source to one of three terminals of said load, establishing said existing phase rotation order at said load, each said path including a pair of oppositely polled, parallel connected SCR devices enabled by gate drive signals from a first SCR driver;

an event detector having an input connected to said load and having an output connected to said first SCR driver, for turning off said gate drive signals in response to detecting a power failure from said existing power source to said load;

a control unit having an input connected to said event detector, for registering the detection of said power failure to said load;

a waveform coincidence detector having a load master voltage waveform input connected to one of said three terminals of said load and three source inputs each respectively connected to one of said output voltage terminals of said takeover power source, and an output connected to said control unit, for identifying which one of said three output voltage terminals of said takeover power source has a voltage waveform which most closely matches said load master voltage waveform and outputting the resulting identity of the takeover source terminal to said control unit;

a second SCR bank having an input coupled to said control unit for establishing three selectable paths, each respectively connecting a selected one of said output voltage terminals of said takeover power source to one of said terminals of said load so that said takeover phase rotation order is in the same sequence as said existing phase rotation order at said load, said selectable paths being selected by said control unit to connect said identified one of said three output voltage terminals of said takeover power source to said one of said three load terminals having said master voltage waveform, each said selectable path including a pair of oppositely polled, parallel connected SCR devices enabled by gate drive signals from a second SCR driver;

a current sensor having three inputs each respectively connected to one of said three paths of said first SCR bank, and an output connected to said control unit, for determining the direction and magnitude of the current flowing in each one of said three paths of said first SCR bank;

said control unit having an output connected to said second SCR driver, for connecting said takeover power source to said load in response to said detection of said power failure from said existing power source to said load, by controlling said second SCR driver to output gate drive signals to a first SCR in each said pair of SCRs in each one of said three selectable paths, to provide an initial current having the same direction in each corresponding one of said three terminals of said load as the existing current therein at the instant when said power failure has been detected, followed by said control unit controlling said second SCR driver to output gate drive signals to a second SCR in each said pair of SCRs in each one of said three selectable paths, when the magnitude of the current flowing in each corresponding one of said three paths of said first SCR bank is substantially zero;

whereby a smooth transition can be made in transferring the load from the existing power source to the takeover power source.

3. An asynchronous multiphase switching circuit to transfer a three phase load from an existing three phase power source to a takeover three phase power source, said existing power source having three output voltage terminals whose voltage phase sequence is characterized by an existing phase rotation order, said takeover power source having three output voltage terminals whose voltage phase sequence is characterized by a takeover phase rotation order, comprising:

a first SCR bank having three paths, each respectively connecting each of said output voltage terminals of said existing power source to one of three terminals of said load, establishing said existing phase rotation order at said load, each said path including a pair of oppositely polled, parallel connected SCR devices enabled by gate drive signals from a first SCR driver;

an initiating means having an output connected to said first SCR driver, for outputting a signal initiating said transfer by turning off said gate drive signals;

a control unit having an input connected to said initiating means, for registering the initiation of said transfer;

a waveform coincidence detector having a load master voltage waveform input connected to one of said three terminals of said load and three source inputs each respectively connected to one of said output voltage terminals of said takeover power source, and an output connected to said control unit, for identifying which one of said three output voltage terminals of said takeover power source has a voltage waveform which most closely matches said load master voltage waveform and outputting the resulting identity of the takeover source terminal to said control unit;

a second SCR bank having an input coupled to said control unit for establishing three selectable paths, each respectively connecting a selected one of said output voltage terminals of said takeover power source to one of said terminals of said load so that said takeover phase rotation order is in the same sequence as said existing phase rotation order at said load, said selectable paths being selected by said control unit to connect said identified one of said three output voltage terminals of said takeover power source to said one of said three load terminals having said master voltage waveform, each said selectable path including a pair of oppositely polled, parallel connected SCR devices enabled by gate drive signals from a second SCR driver;

a current sensor having three inputs each respectively connected to one of said three paths of said first SCR bank, and an output connected to said control unit, for determining the direction and magnitude of the current flowing in each one of said three paths of said first SCR bank;

said control unit having an output connected to said second SCR driver, for connecting said takeover power source to said load in response to said output signal from said initiating means, by controlling said second SCR driver to output gate drive signals to a first SCR in each said pair of SCRs in each one of said three selectable paths, to provide an initial current having the same direction in each corresponding one of said three terminals of said load as the existing current therein when said initiating means outputs said signal, followed by said control unit controlling said second SCR driver to output gate drive signals to a second SCR in each said pair of SCRs in each one of said three selectable paths, when the magnitude of the current flowing in each corresponding one of said three paths of said first SCR bank is substantially zero;

whereby a smooth transition can be made in transferring the load from the existing power source to the takeover power source.

* * * * *